US009581474B2

(12) United States Patent
Alekseyev et al.

(10) Patent No.: US 9,581,474 B2
(45) Date of Patent: Feb. 28, 2017

(54) FLOW MEASURING DEVICE FOR LUBRICATION SYSTEMS

(71) Applicant: Lincoln Industrial Corporation, St. Louis, MO (US)

(72) Inventors: Viktor Alekseyev, St. Louis, MO (US); Nathan David Donovan, Columbia, IL (US); Eric Krassinger, St. Louis, MO (US); Canlong He, St. Peters, MO (US); Brad Allen Edler, Waterloo, IL (US); Paul G. Conley, St. Charles, MO (US)

(73) Assignee: Lincoln Industrial Corporation, St. Louis, MO (US)

( * ) Notice: Subject to any disclaimer, the term of this patent is extended or adjusted under 35 U.S.C. 154(b) by 0 days.

(21) Appl. No.: 14/586,002

(22) Filed: Dec. 30, 2014

(65) Prior Publication Data

US 2015/0177034 A1  Jun. 25, 2015

Related U.S. Application Data

(63) Continuation-in-part of application No. PCT/US2014/058059, filed on Sep. 29, 2014.

(60) Provisional application No. 61/884,713, filed on Sep. 30, 2013.

(51) Int. Cl.
| G01F 15/06 | (2006.01) |
| G01F 1/24 | (2006.01) |
| G01F 3/06 | (2006.01) |
| G01F 3/10 | (2006.01) |
| G01F 1/56 | (2006.01) |

(52) U.S. Cl.
CPC . *G01F 1/24* (2013.01); *G01F 1/56* (2013.01); *G01F 3/06* (2013.01); *G01F 3/10* (2013.01)

(58) Field of Classification Search
None
See application file for complete search history.

(56) References Cited

U.S. PATENT DOCUMENTS

| 3,036,460 | A | * | 5/1962 | Buck | E21B 33/1275 324/168 |
| 3,330,155 | A | | 7/1967 | Miville | |
| 4,101,874 | A | * | 7/1978 | Denison | G01F 1/075 116/204 |
| 4,253,341 | A | | 3/1981 | Ikeda et al. | |
| 4,308,755 | A | * | 1/1982 | Millar | G01F 1/115 73/861.77 |
| 4,815,318 | A | * | 3/1989 | LoPresti | G01F 3/10 73/261 |

(Continued)

*Primary Examiner* — Harshad R Patel
(74) *Attorney, Agent, or Firm* — Senniger Powers LLP

(57) ABSTRACT

A flow measuring device for measuring flow of a fluid. A housing has a passage which extends between an inlet and an outlet. A shaft is disposed within the housing and is rotatable about a central axis. A flow detector is mounted on the shaft and disposed at least partially within the passage. The flow detector includes a rotatable, generally cylindrical body that rotates about a central axis as the fluid flows. A magnet is mounted on the rotatable body or on the shaft, and is configured to rotate simultaneously with the body about the central axis. A sensor is disposed within the housing and configured to sense rotation of the magnet as the flow detector angularly displaces about the central axis so as to detect angular displacement of the flow detector.

10 Claims, 25 Drawing Sheets

(56) References Cited

U.S. PATENT DOCUMENTS

| | | | | |
|---|---|---|---|---|
| 4,878,454 A * | 11/1989 | Cann | B05B 5/16 | 73/261 |
| 5,099,699 A * | 3/1992 | Kobold | G01F 1/06 | 73/861.79 |
| 5,184,519 A | 2/1993 | Ciarelli et al. | | |
| 5,303,597 A * | 4/1994 | Noren | G01F 1/05 | 73/32 R |
| 5,415,041 A * | 5/1995 | Foran, Jr. | G01F 3/10 | 73/261 |
| 5,721,383 A * | 2/1998 | Franklin | G01F 1/075 | 73/861.77 |
| 5,824,916 A | 10/1998 | Posner, Jr. et al. | | |
| 5,876,610 A * | 3/1999 | Clack | B01D 35/143 | 210/282 |
| 5,965,825 A * | 10/1999 | Nitecki | G01D 5/145 | 222/71 |
| 6,212,959 B1 | 4/2001 | Perkins | | |
| 6,250,151 B1 * | 6/2001 | Tingleff | G01F 3/10 | 73/253 |
| 6,422,162 B1 * | 7/2002 | Nimberger | A01C 23/007 | 73/204.19 |
| 6,481,293 B1 * | 11/2002 | Walczak | G01F 1/115 | 73/861.77 |
| 6,522,038 B2 * | 2/2003 | Byram | F02D 11/10 | 251/129.11 |
| 6,604,434 B1 * | 8/2003 | Hamilton | G01F 1/075 | 73/861.75 |
| 7,249,524 B2 * | 7/2007 | Williams | G01F 1/115 | 73/861 |
| 7,426,875 B1 * | 9/2008 | McMillan | G01F 1/065 | 73/861.79 |
| 8,757,009 B2 * | 6/2014 | Jennings | B67D 7/04 | 700/244 |
| 8,789,429 B2 * | 7/2014 | Etter | G01F 15/006 | 73/861.79 |
| 2001/0042400 A1 * | 11/2001 | Boyle | B03C 3/28 | 73/54.28 |
| 2002/0083778 A1 * | 7/2002 | Hamilton | G01F 15/075 | 73/861.78 |
| 2002/0145568 A1 * | 10/2002 | Winter | G01D 4/006 | 343/701 |
| 2004/0060603 A1 * | 4/2004 | Song | G01F 1/115 | 137/554 |
| 2005/0000302 A1 * | 1/2005 | Winter | G01D 5/28 | 73/861.77 |
| 2005/0039546 A1 * | 2/2005 | Payne | G01F 1/115 | 73/861.79 |
| 2005/0081642 A1 * | 4/2005 | Nehl | G01F 1/115 | 73/861.79 |
| 2006/0162467 A1 * | 7/2006 | Winter | G01K 17/12 | 73/861.79 |
| 2008/0202255 A1 * | 8/2008 | Albrecht | G01F 15/066 | 73/861.08 |
| 2009/0126478 A1 * | 5/2009 | Moilanen | G01F 3/10 | 73/261 |
| 2012/0090406 A1 * | 4/2012 | Etter | G01F 15/006 | 73/861.79 |

* cited by examiner

FIG. 4

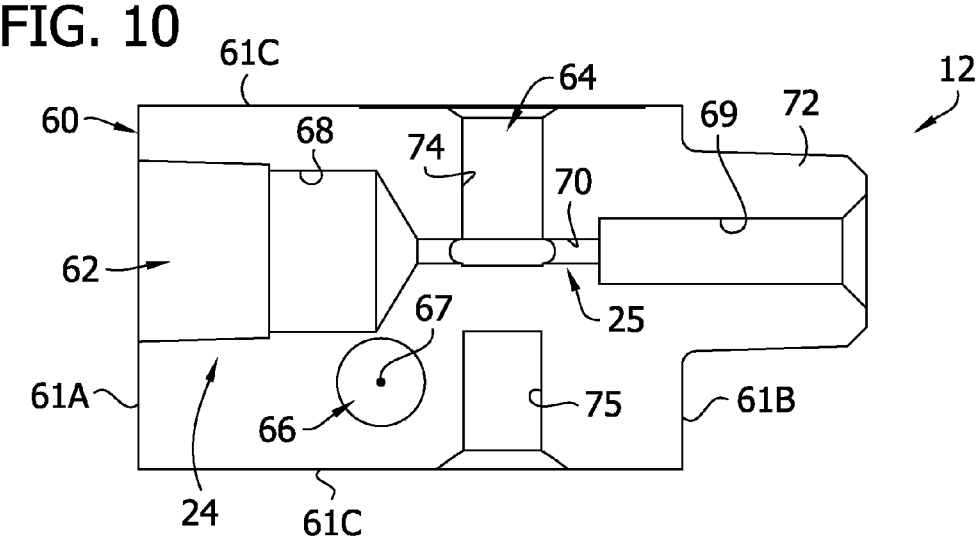
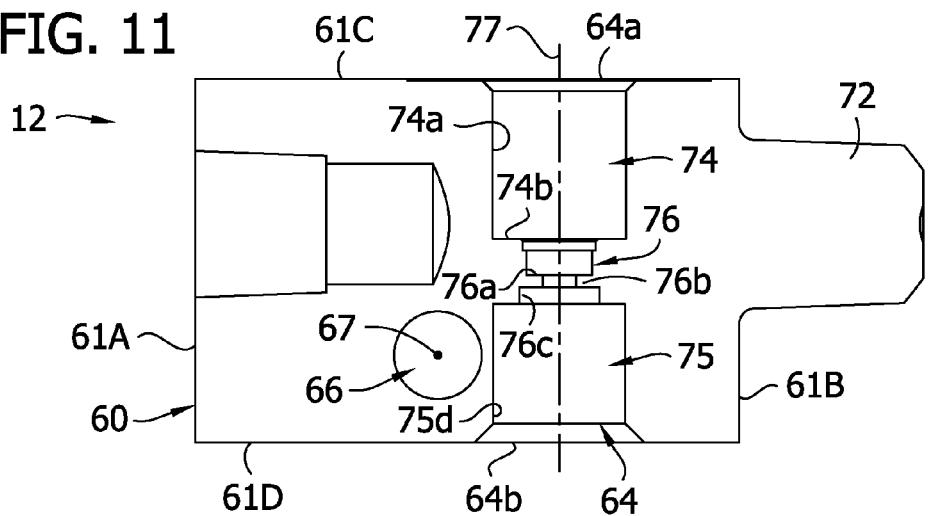
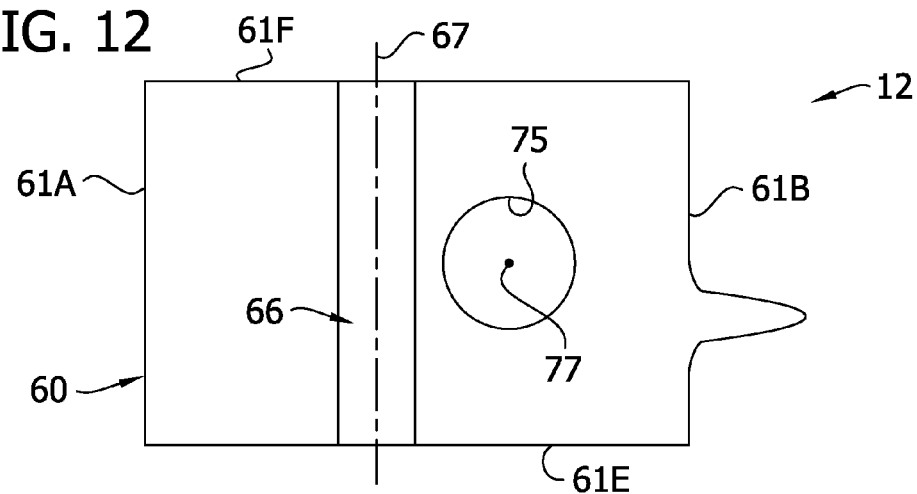

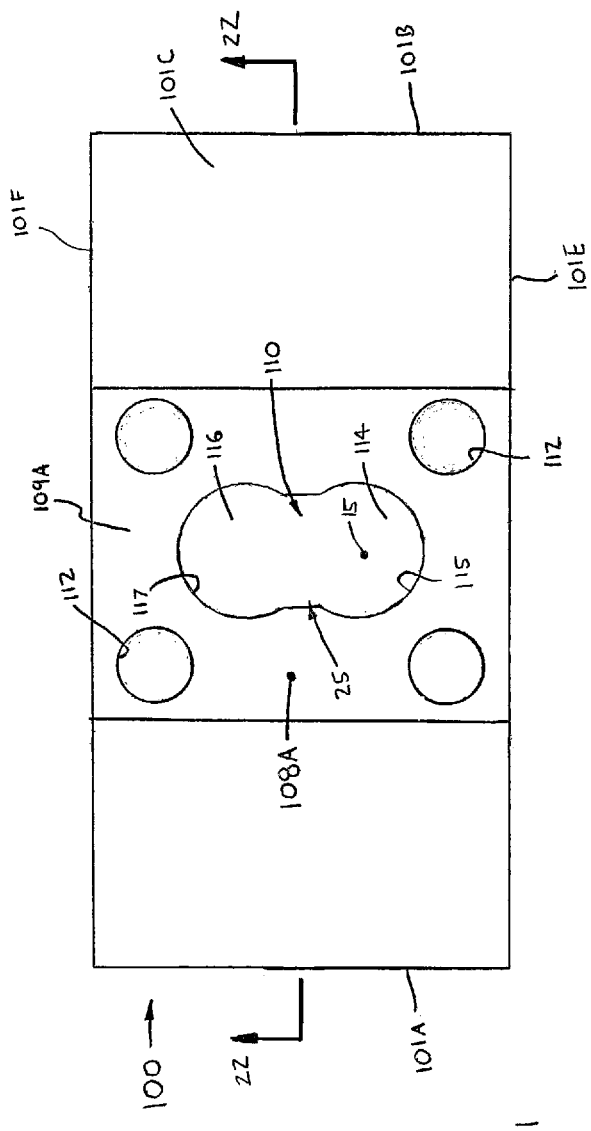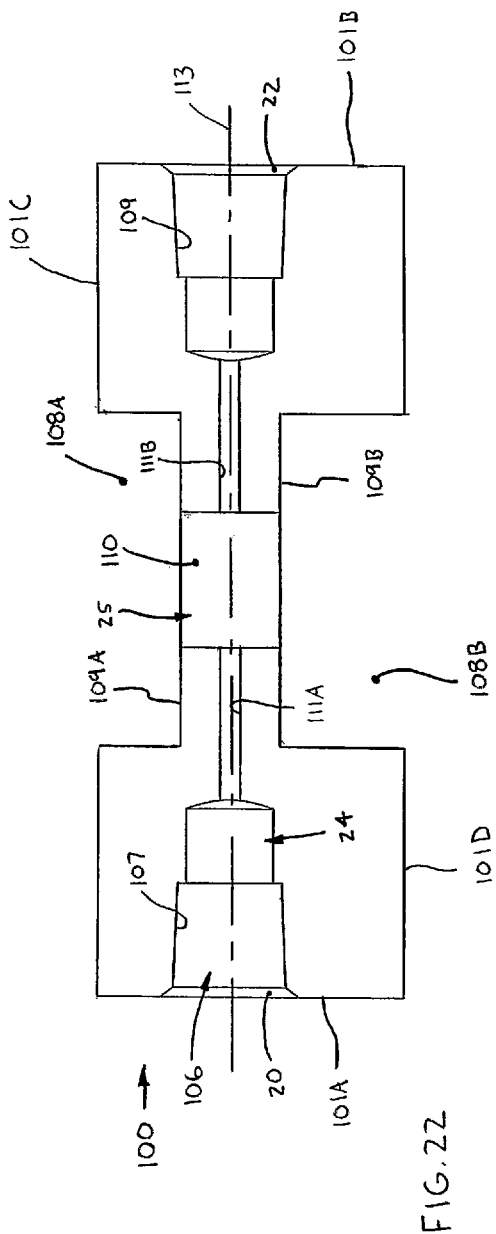
FIG. 21
FIG. 22

FLOW MEASURING DEVICE FOR LUBRICATION SYSTEMS

BACKGROUND OF THE INVENTION

The present invention relates to flow measuring devices, and particularly to such devices for use with highly viscous lubricants.

Flow detecting or measuring devices are particularly important for lubrication systems as such devices confirm that sufficient lubrication has in fact been dispensed to critical system components. Such flow measuring devices typically include a housing containing a passage for carrying a portion of the flow to be measured and a detection/measurement component or assembly for detecting, or actually measuring, the flow through the passage. Previous measuring devices have used components such as thermistors, transducers, induction sensors or other complex electronic devices to detect or measure flow and often required specialized equipment, such as a customized controller, to receive and evaluate the information from the particular measuring unit. These known measuring devices are generally relatively expensive and often inadequately robust to operate in the temperature extremes often experienced by many lubrication systems and to measure small amounts of lubricant flow.

Further, previous flow detecting or measuring devices typically utilize two oval shaped gears arranged to rotate in a chamber through which a medium to be measured is passed. The flow rate is calculated from the number of revolutions of the gears. Because of the progressive shape of the cavity between the wall and the gears as the gears rotate, one rotational motion of the gears is not proportional to the flow rate. These known devices require several rotations to properly configure the device, and the resulting flow rate output must be extrapolated based upon the results of the configuration instead of being directly determined.

SUMMARY OF THE INVENTION

In one aspect, the present invention is a device for measuring flow of a fluid, the device comprising a housing having an inlet, an outlet and a passage extending between the inlet and outlet. A shaft is disposed within the housing and is rotatable about a central axis. A flow detector mounted on the shaft and disposed at least partially within the passage such that the fluid flows through the passage at a linear flow rate directly proportional to an angular rotation of the flow detector about the central axis. Further, the flow detector includes a rotatable, generally cylindrical body that rotates about the central axis as the fluid flows. A magnet is mounted on the rotatable body or on the shaft, and is configured to rotate simultaneously with the body about the central axis. A sensor is disposed within the housing and configured to sense rotation of the magnet as the flow detector angularly displaces about the central axis so as to detect angular displacement of the flow detector.

In another aspect, the present invention is again a device for measuring flow of a fluid, the flow measuring device comprising a housing having an inlet, an outlet and a passage extending between the inlet and outlet. A shaft is disposed within the housing and is rotatable about a central axis. A flow detector is mounted on the shaft and is disposed at least partially within the passage such that fluid flows through the passage at a linear flow rate directly proportional to an angular rotation of the flow detector about the central axis. The fluid flow through the passage rotates the flow detector about the central axis, and the flow detector includes a rotatable generally cylindrical body that rotates about the central axis as the fluid flows. A polar magnet having a magnetic field mounted on a rotatable body is configured to rotate simultaneously with the body about the central axis. A magnetic encoder is disposed within the housing and is configured to sense rotation of the polar magnet as the flow detector angularly displaces about the central axis so as to detect angular displacement of the flow detector. Furthermore, a processor is electrically coupled with the sensor and configured to continually read an angular value present on the magnetic encoder and configured to determine the angular position of the polar magnet and configured to determine at least one of a flow rate of the fluid through the passage and a total volume of flow of the fluid through the passage.

In yet another aspect, the present invention is again a device for measuring flow of a viscous fluid, the flow measuring device comprising a housing having an inlet, an outlet and a passage extending between the inlet and outlet. A shaft is disposed within the housing and rotatable about a central axis, the axis extending generally perpendicular to at least one section of the passage. A generally cylindrical flow detector disk is mounted on the shaft. The flow detector disk has a plurality of cavities spaced circumferentially about the central axis and is disposed at least partially within the passage so as to substantially obstruct the section of the passage. The fluid flowing through the passage contacts the disk, at least partially fills at least one of the cavities and rotates the disk about the central axis while the disk transports the fluid through the flow passage section such that the fluid flows through the passage at a linear flow rate directly proportional to an angular rotation of the flow detector about the central axis. A sensor is disposed within the housing and is configured to sense rotation of the shaft or the flow detector disk about the central axis so as to detect angular displacement of the detector disk. A processor is electrically coupled with the sensor and is configured to determine at least one of a flow rate of the fluid through the passage, an indication of a flow event, and a total volume of flow of the fluid through the passage.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

Figure 4:
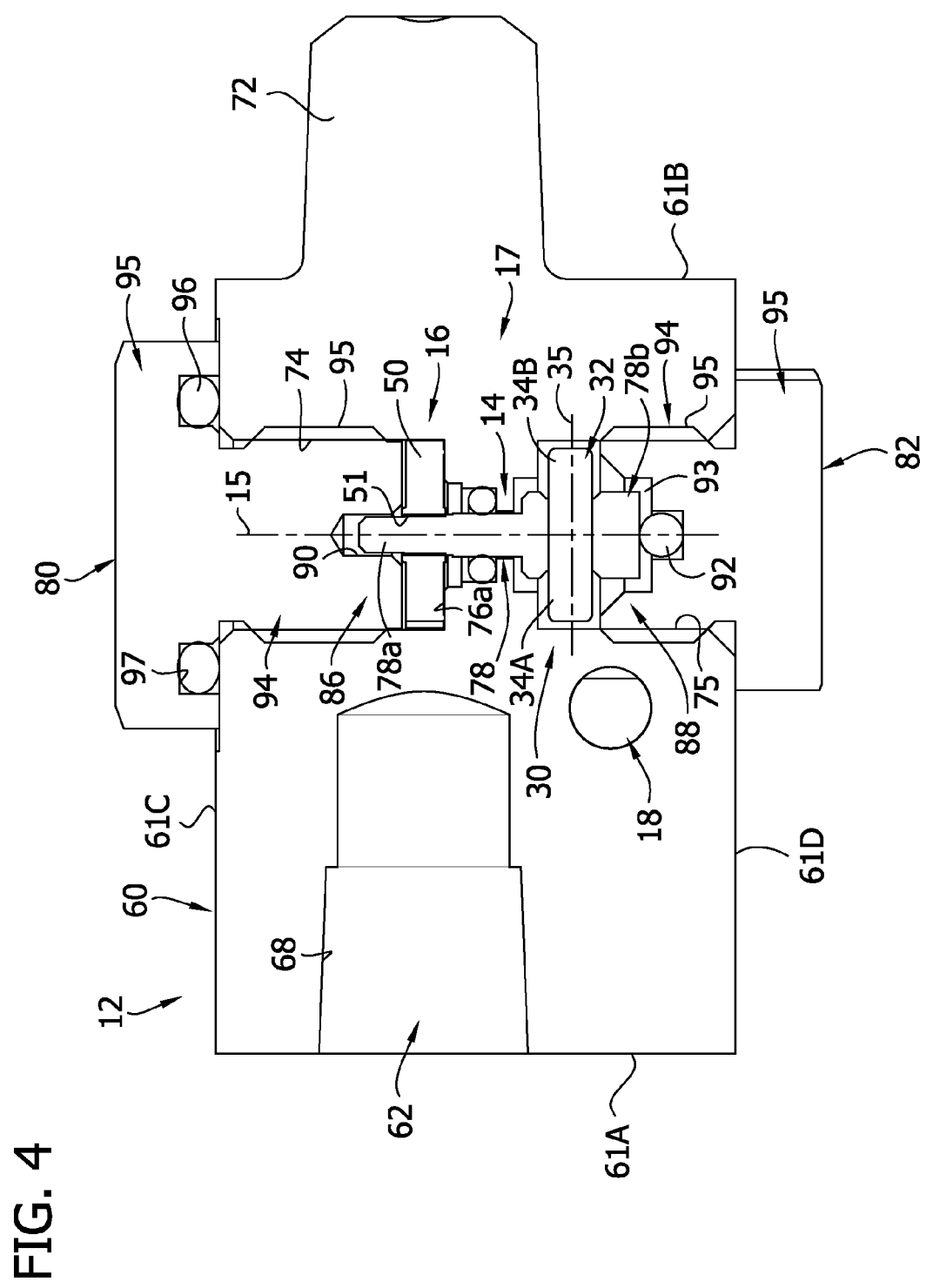

FIG. 4 is a cross-sectional view through line 4-4 of FIG. 1;

FIG. 7, are each a broken-away, cross-sectional view of a central portion of FIG. 6, each depicting a different angular position of a magnet of the measuring device;

FIG. 10 is a cross-sectional view through line 3-3 of FIG. 1, showing a housing of the flow measuring device;

FIG. 11 is a cross-sectional view through line 4-4 of FIG. 1, showing the housing of the flow measuring device;

FIG. 12 is a cross-sectional view through line 6-6 of FIG. 2, showing the housing of the flow measuring device;

FIG. 21 is a top plan view of a base of a housing of the second preferred construction;

FIG. 22 is a cross-sectional view through line 22-22 of FIG. 21;

DETAILED DESCRIPTION OF THE INVENTION

Figure 1:
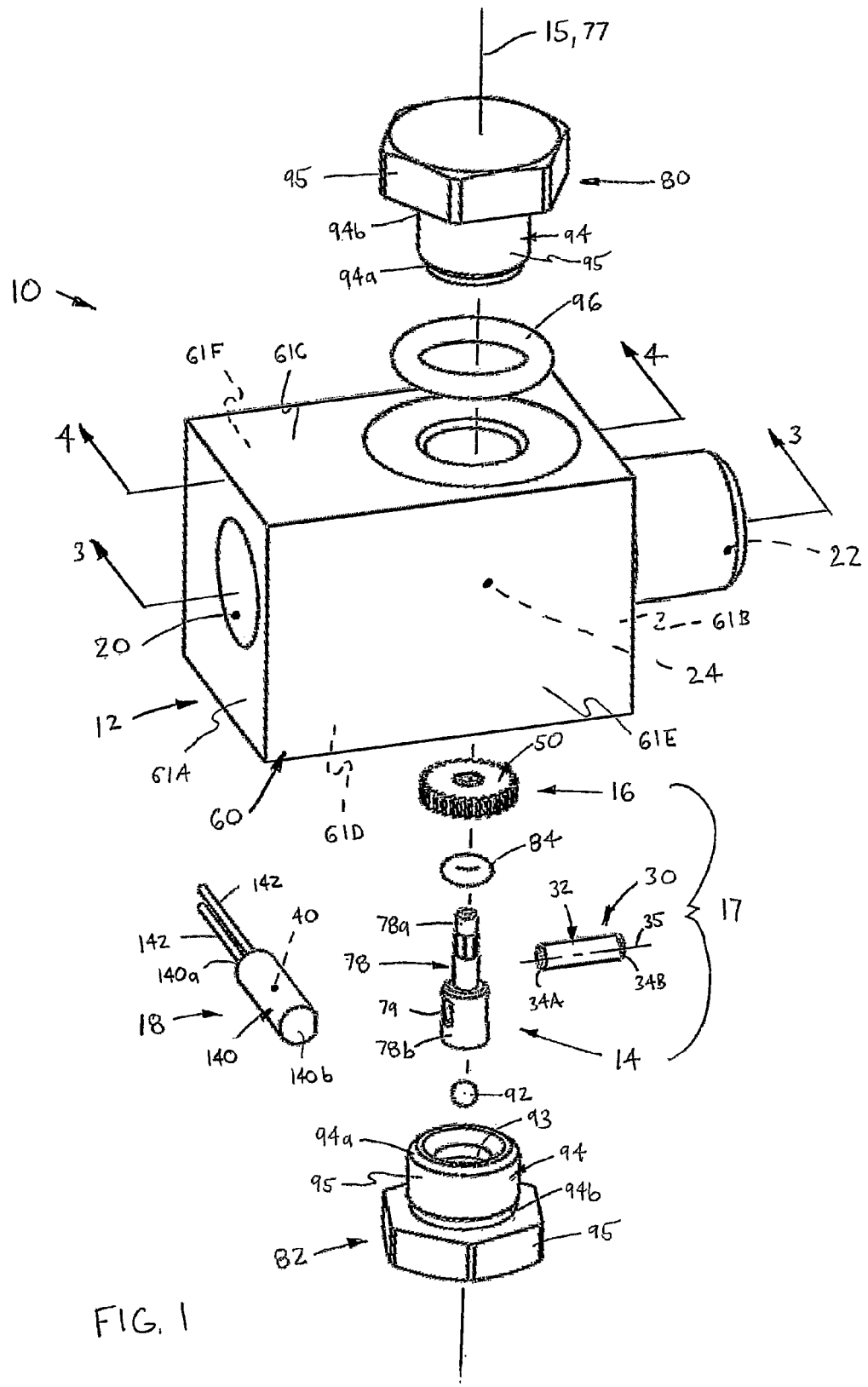
FIG. 1 is an exploded view of a flow measuring device in accordance with a first preferred construction of the present invention.
Figure 2:
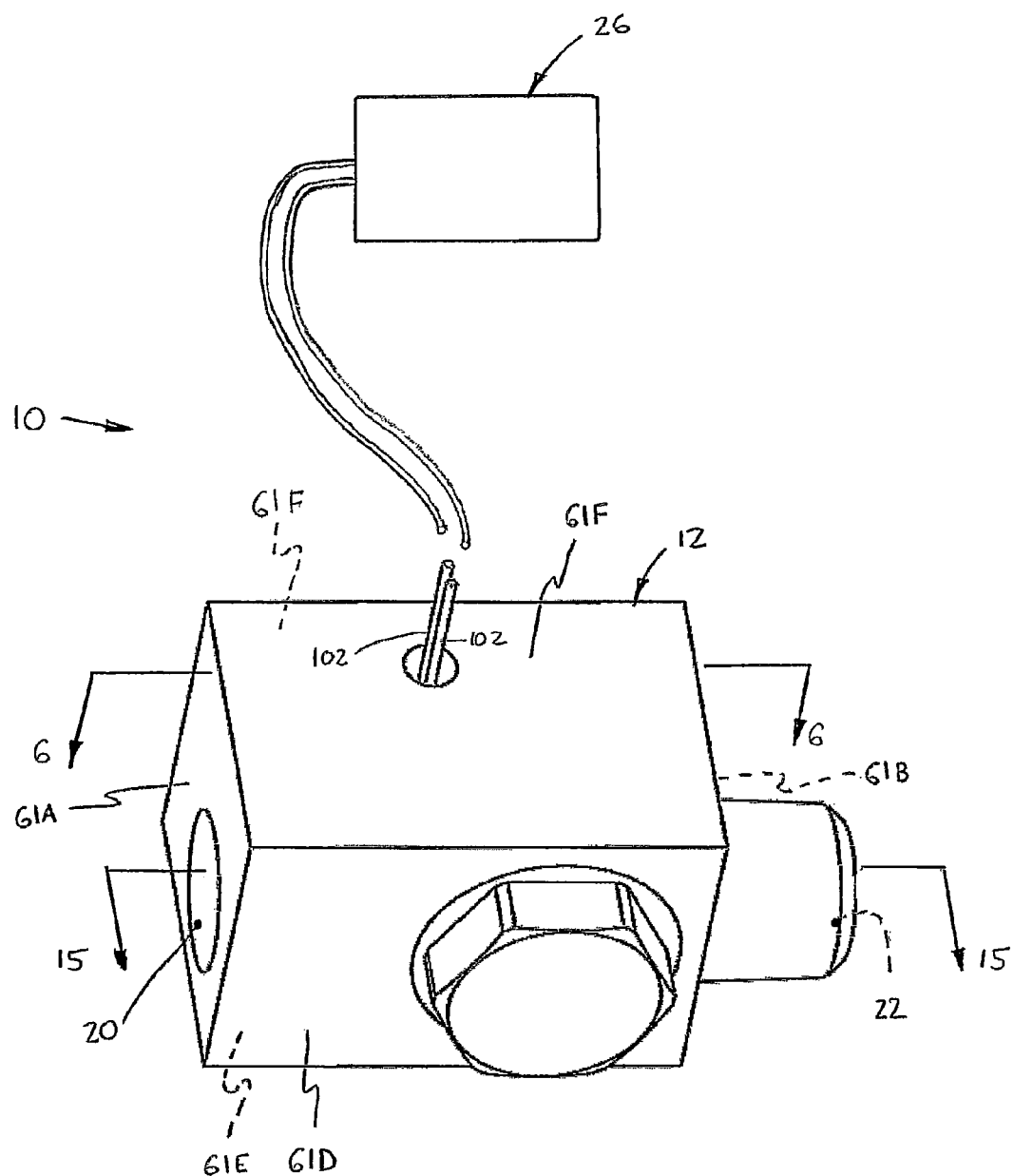
FIG. 2 is a rear, bottom perspective view of the measuring device, showing a more diagrammatic view of a processor.
Figure 3:
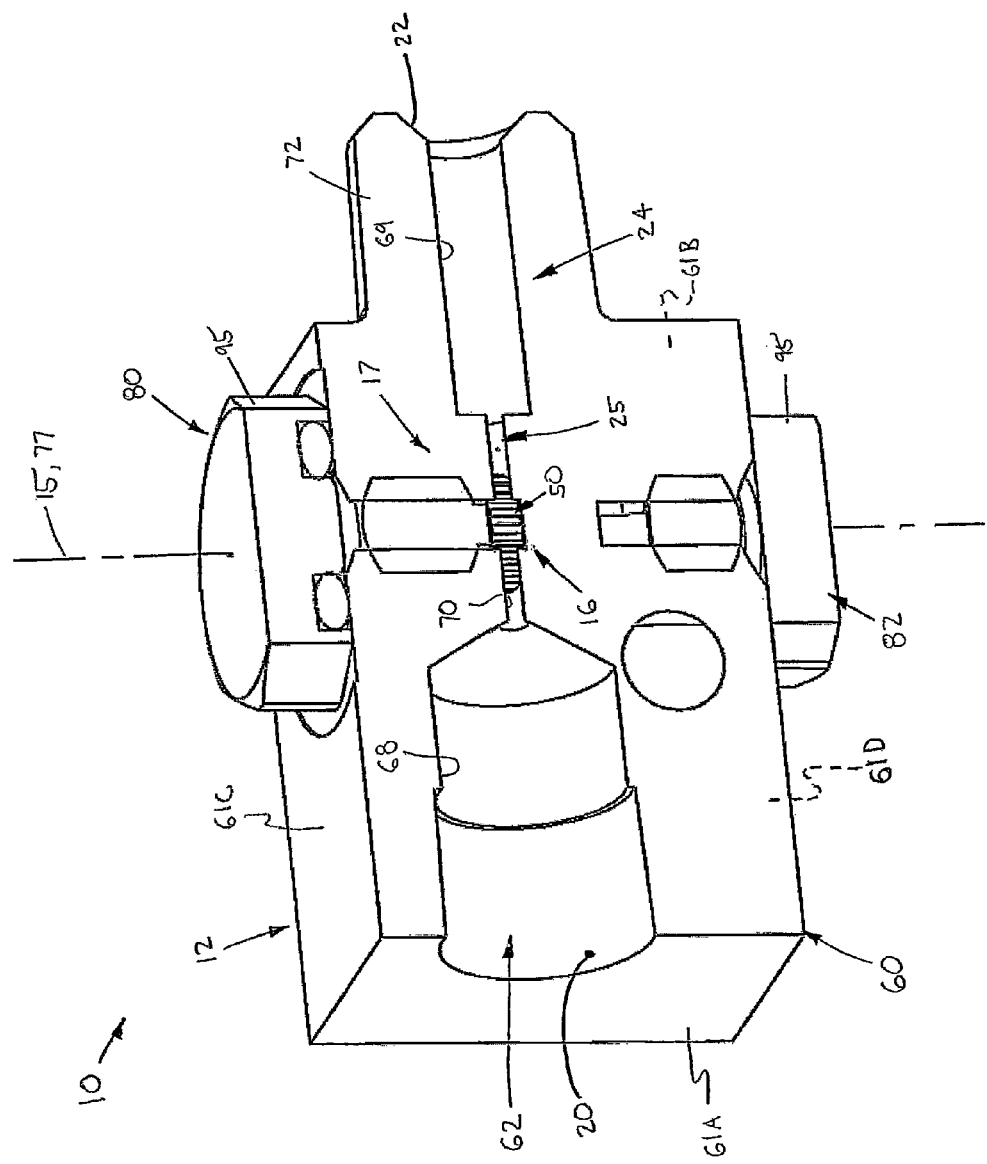
FIG. 3 is a perspective, cross-sectional view through line 3-3 of FIG. 1.

Certain terminology is used in the following description for convenience only and is not limiting. The words "right", "left", "lower", "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. Furthermore, the term "fluid" as used herein is intended to include both liquids and semi-solids capable of being transported through a passage, a channel, a tube or similar structure, and the term "flow" is intended to mean any such movement, conveyance or transportation of a "fluid". The terminology includes the words specifically mentioned above, derivatives thereof, and words of similar import.

Referring now to the drawings in detail, wherein like numbers are used to indicate like elements throughout, there is shown in FIGS. 1-25 a device 10 for measuring flow of a fluid F, preferably a highly viscous fluid such as a grease or other relatively "thick" lubricant. The flow measuring device 10 basically comprises a housing 12, a shaft 14 disposed within the housing 12 and rotatable about a central axis 15, a flow detector 16 mounted on the shaft 14 and a sensor 18 configured to sense rotation of the shaft 14 about the axis 15. The housing 12 has an inlet 20 connectable with a first section 1a of a lubricant line 1 (FIG. 13), an outlet 22 connectable with a second section 1b of the lubricant line 1, and a flow passage 24 extending between the inlet 20 and the outlet 22. The flow detector 16 is disposed at least partially within a "measuring" section 25 of the passage 24 such that flow of the fluid F through the passage 24 rotates the detector 16 about the central axis 15. Further, the flow measuring device 10 preferably also comprises a processor 26 electrically coupled with the sensor 18 and configured to determine a flow rate of the fluid F through the passage 24 and/or a total volume of flow of the fluid F through the passage 24, as discussed in further detail below.

Figure 5:
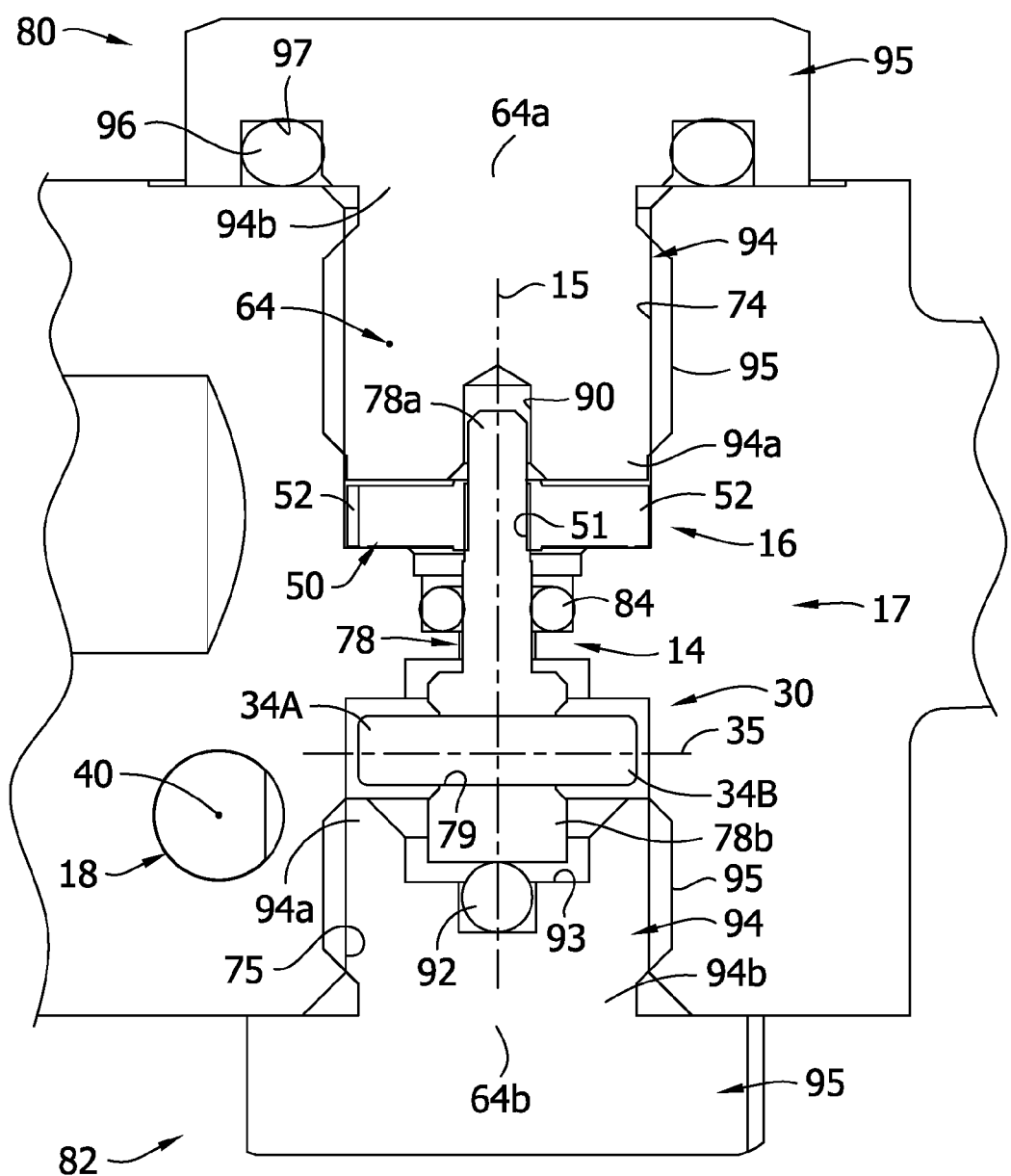
FIG. 5 is a broken-away, enlarged view of a central portion of FIG. 4.
Figure 6:
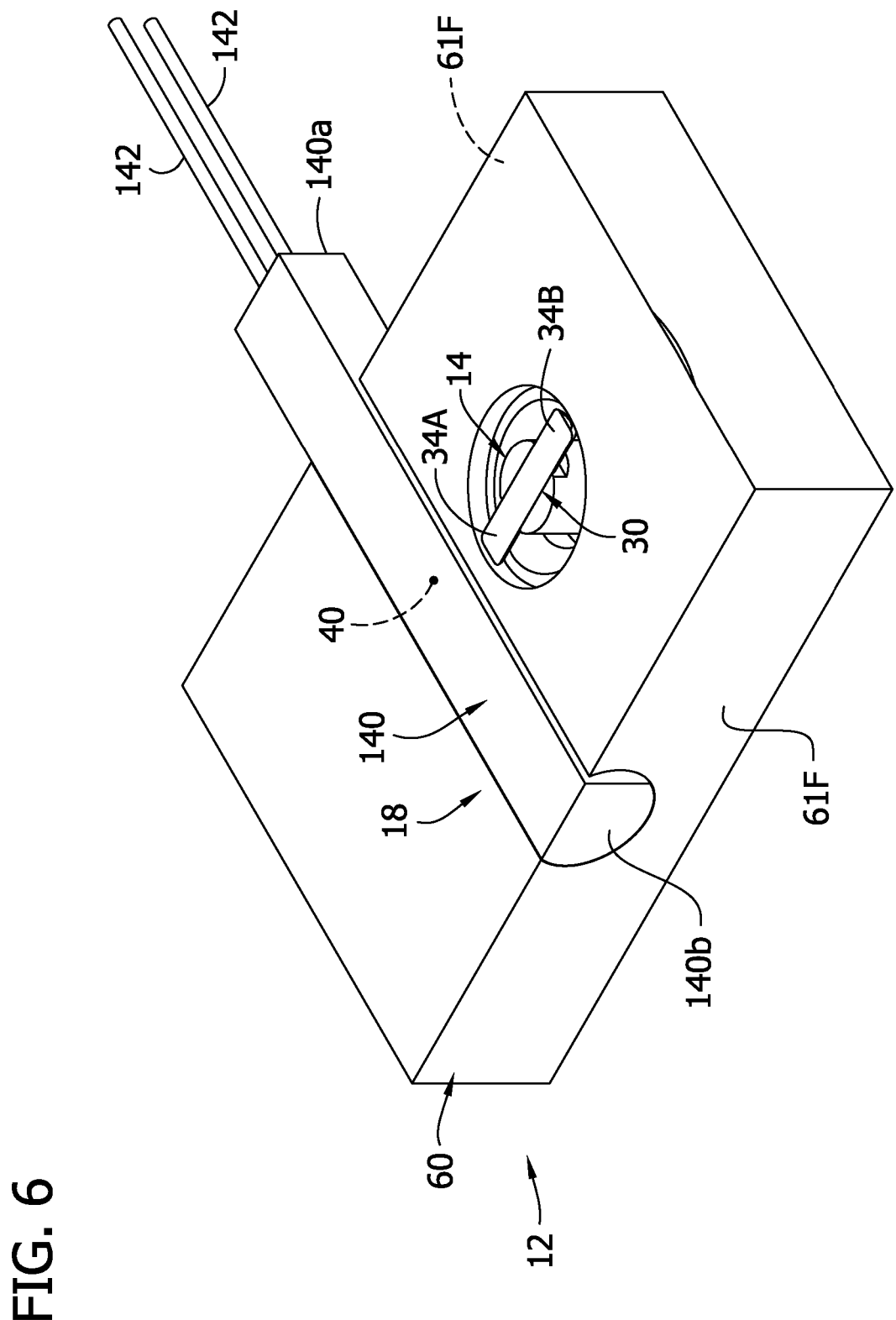
FIG. 6 is a perspective cross-sectional view through line 6-6 of FIG. 2.
Figure 8:
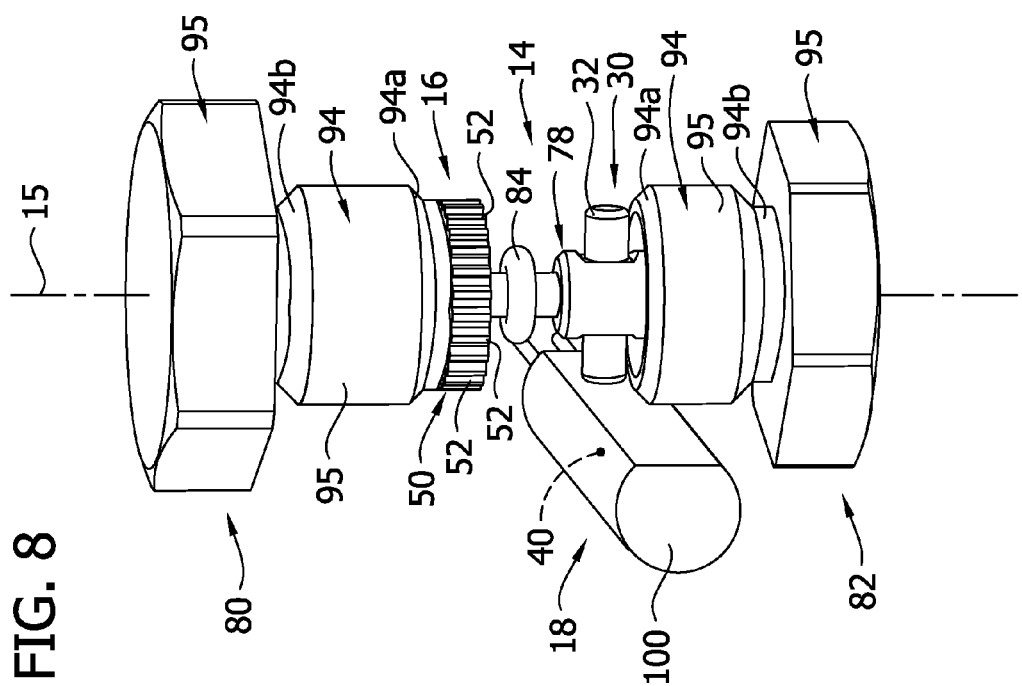
FIG. 8 is a perspective view of a sensor and detector assembly of the flow measuring device.
Figure 18:
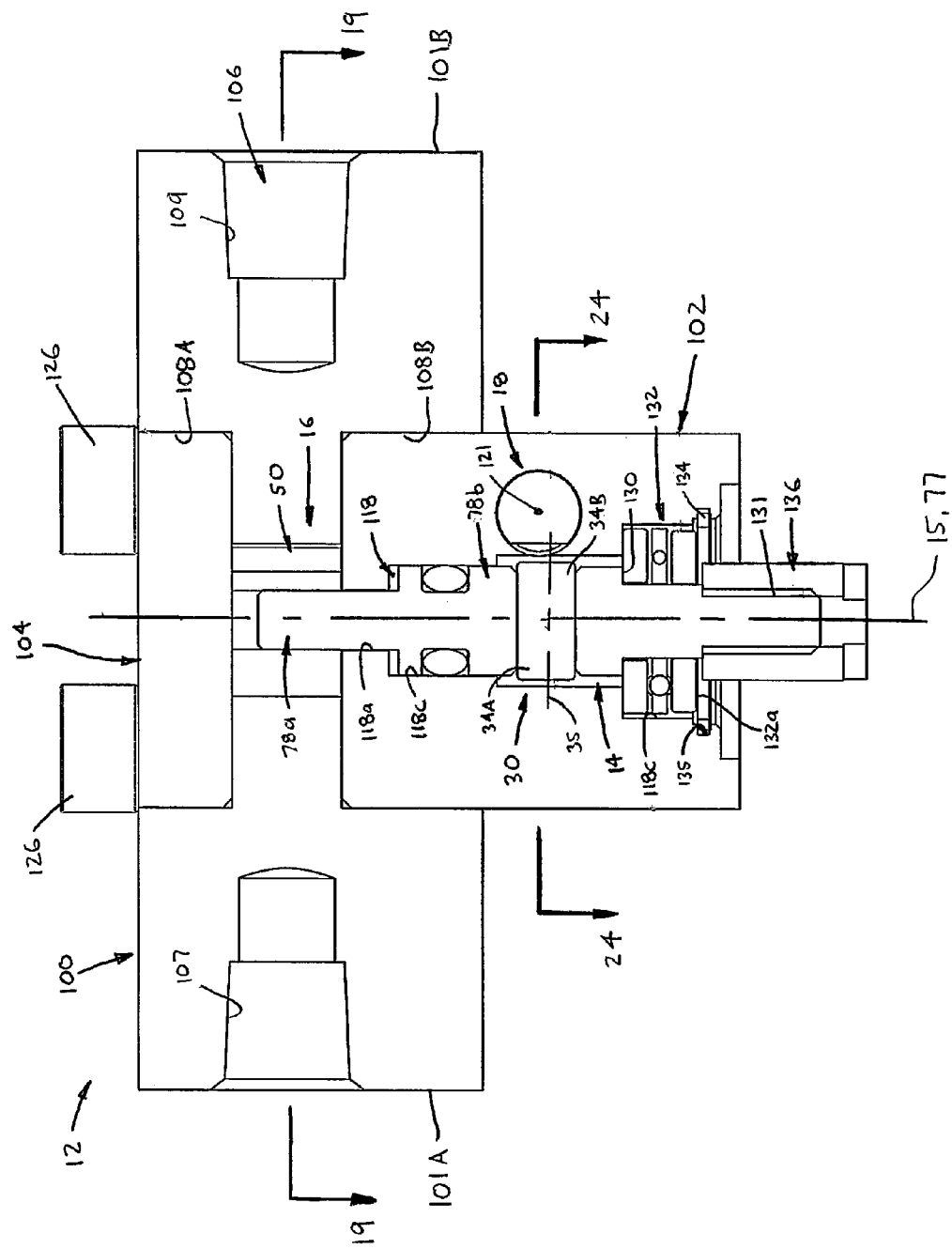
FIG. 18 is a cross-sectional view through line 18-18 of FIG. 17.
Figure 19:
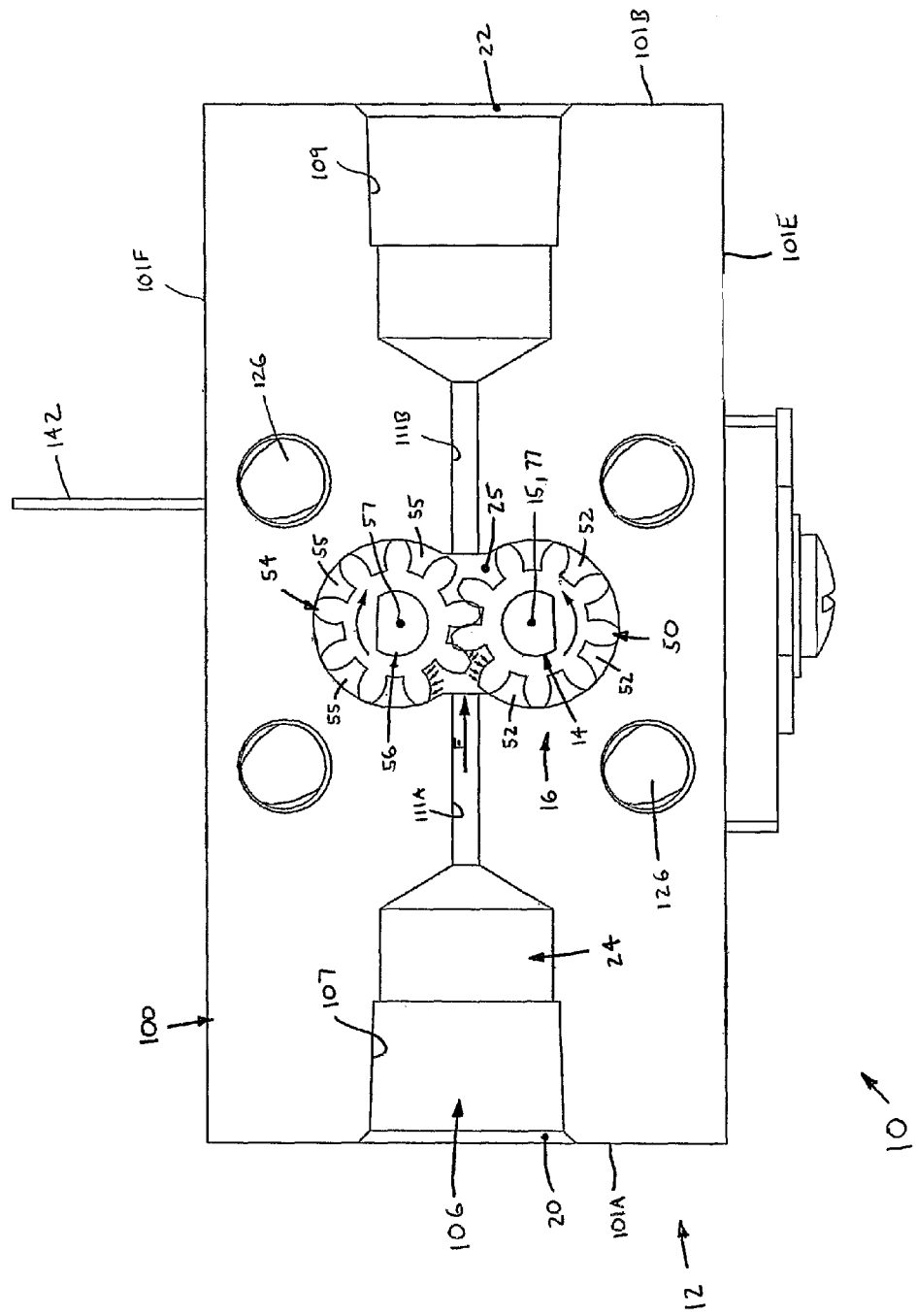
FIG. 19 is a cross-sectional view through line 19-19 of FIG. 18.

Preferably, a magnet 30 is mounted on the shaft 14 and is spaced axially from the detector 16, such that the shaft 14, the flow detector 16 and the magnet 30 form a detector assembly 17, as best shown in FIGS. 5, 8 and 18. The sensor 18 is configured to sense rotation of the magnet 30 as the shaft 14 angularly displaces about the central axis 15, so as to thereby detect angular displacement of the flow detector 16. Alternatively, the sensor 18 may either directly sense rotation of the shaft 14 or sense another component mounted on or formed with the shaft 14, such as for example, sensing optical markings on the shaft 14 or a toothed wheel mounted on the shaft 14 (neither shown).

In preferred constructions, the magnet 30 includes a generally circular cylindrical rod 32 having two opposing ends 34A, 34B and a centerline 35 extending between the two ends 34A, 34B. One rod end 34A provides a north magnetic pole N and the other rod end 34B provides a south magnetic pole S. Further, the rod 32 is generally centered on the axis 15 such that the centerline 35 extends generally perpendicular to, and generally intersects, the central axis 15 and the two rod ends 34A, 34B are located generally equidistant from the axis 15. As such, the two rod ends 34A, 34B displace generally along a circular path $P_C$ (FIG. 7) extending about the central axis 15 as the shaft 14 rotates about the axis 15.

With this arrangement, each of the north and south poles N, S angularly displaces through first, second, third and fourth angular positions $A_1$, $A_2$, $A_3$ and $A_4$, respectively, on the circular path $C_P$, which are spaced circumferentially apart about the axis 15 by about ninety degrees (90°), as depicted in FIG. 7. Further, the sensor 18 is located in relation to the shaft 14 and the magnetic rod 32 such that the first angular position $A_1$ is generally proximal to the sensor 18, the third position $A_3$ is most distal from the sensor 18, and the second and third positions $A_2$, $A_4$ are generally equidistant from the sensor 18.

Figure 7A:
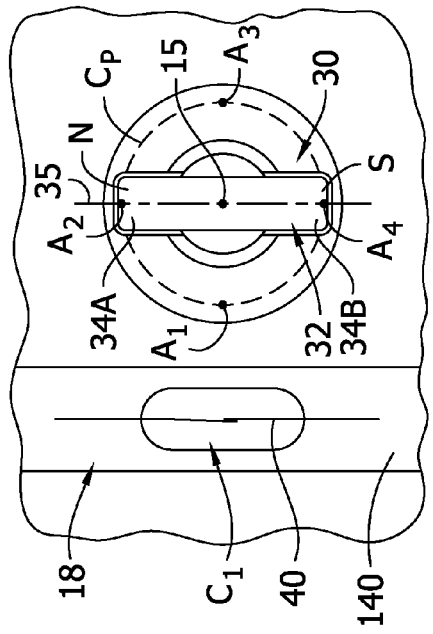
FIGS. 7A-7D, collective
Figure 7B:
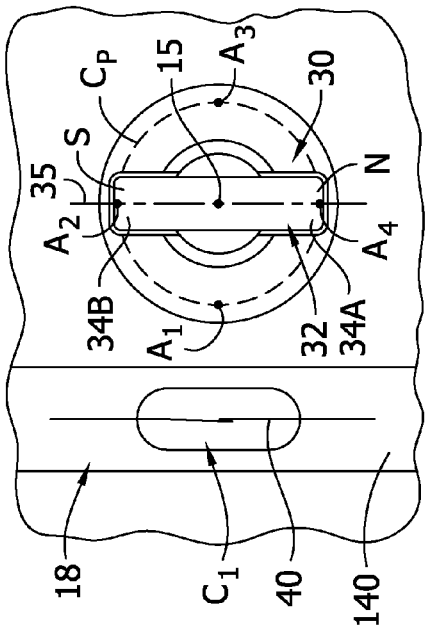
Figure 7C:
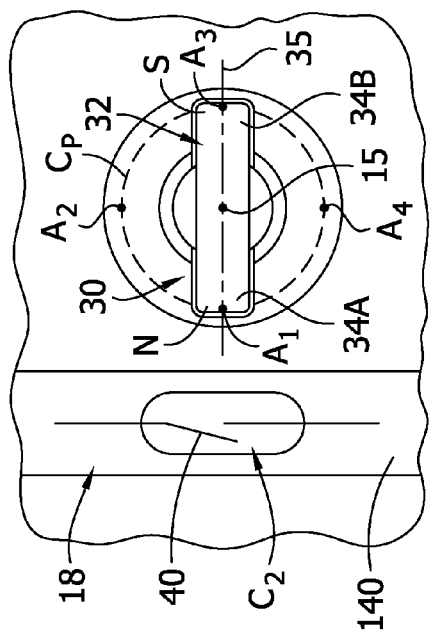
Figure 7D:
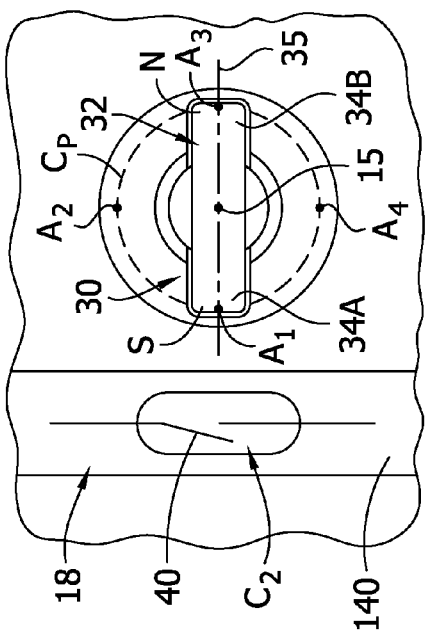
Figure 9:
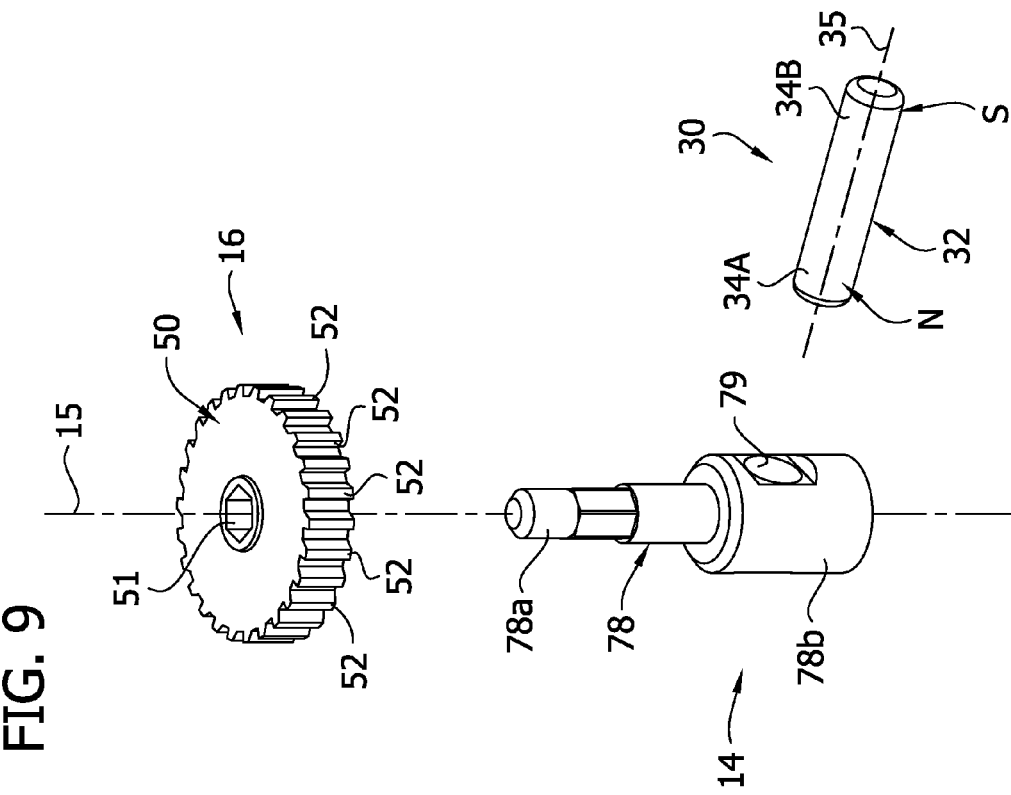
FIG. 9 is an exploded view of a shaft, flow detector and a magnet of the detector assembly of FIG. 8.

With the preferred magnet 30, the sensor 18 preferably includes a switch 40, most preferably a reed switch, disposed within the housing 12 and adjustable between first and second configurations $C_1$, $C_2$. One of the first and second configurations $C_1$, $C_2$ is a closed state (FIGS. 7B and 7A) and the other one of the first and second configurations $C_1$, $C_2$ is an open state (FIGS. 7A and 7B). The switch 40 is configured to adjust from the first configuration $C_1$ to the second configuration $C_2$ when either one of the north and south poles N, S approaches the first angular position $A_1$ on the circular path $P_C$, i.e., the position most proximal to the switch 40, while the other pole N or S thus approaching the most distal position $A_3$, as shown in FIGS. 7A and 7C. The switch 40 is also configured to adjust from the second configuration $C_2$ to the first configuration $C_1$ when each one of the north and south poles N, S approaches a separate one of second and fourth angular positions $A_2$, $A_4$ on the circular path $P_C$ located generally equidistant from the switch 40, as depicted in FIGS. 7B and 7D.

Thus, the second and fourth angular positions $A_2$, $A_4$ are located a sufficient distance from the switch 40 such that magnetic fields of/about each of the two poles N and S are too weak to generate a sufficient force to affect the switch 40. Further, if the switch 40 is a "normally closed switch", the first configuration $C_1$ is a closed state and the second configuration $C_2$ is an open state, as shown in FIG. 7, and alternatively, if the switch 40 is a "normally open switch", the first configuration $C_1$ is an open state and the second configuration $C_2$ is a closed state (not depicted). In either case, as fluid flow within the passage 24 rotates the detector 16, the angularly displacing magnet 30 causes the switch 40 to both open twice and to close twice for each revolution of the detector 16 about the axis 16.

Further, the processor 26 is configured to detect when the switch 40 adjusts to the open state $C_2$ or/and when the switch 40 adjusts to the closed state $C_1$ and to use the detected opening and closing of the switch to determine the angular displacement of the detector 16 about the shaft central axis 15 and/or the angular velocity of the detector 16 about the axis 15. More specifically, each occurrence of the opening or closing of the switch 40 generates an electrical pulse, such that the processor 26 detects that the detector 16 has rotated approximately a "quarter turn" or ninety degrees (90°) about the axis 15 when it receives a pulse. By counting the number of pulses generated by the switch 40, the processor 26 can calculate the total angular displacement of the flow detector 16, and by simultaneously tracking the time elapsed between receipt of the pulses, can also calculate the angular velocity of the rotating detector 16. As the angular displacement of the flow detector 16 can be correlated with the volume of fluid F flowing through the passage measuring section 25, the processor 26 is configured (i.e., programmed or hardwired) to determine total volume of the flow and/or the flow rate through the passage 24. Having described the basic elements and functions above, these and other elements of the present fluid measuring device 10 are described in greater detail below.

Figure 15:
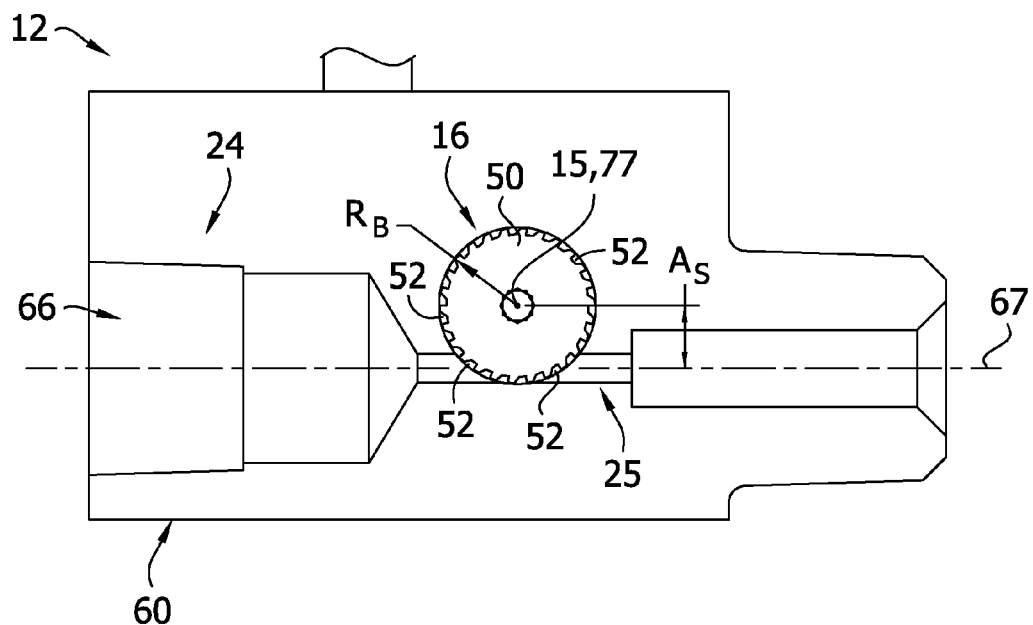
FIG. 15 is a cross-sectional view through line 15-15 of FIG. 1.
Figure 16:
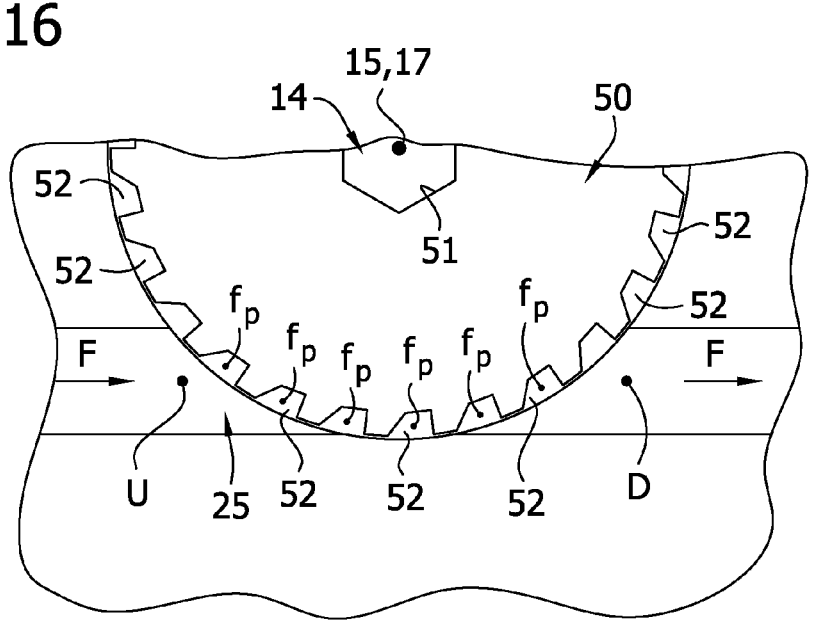
FIG. 16 is a broken-away, enlarged view of a central portion of FIG. 15.
Figure 20:
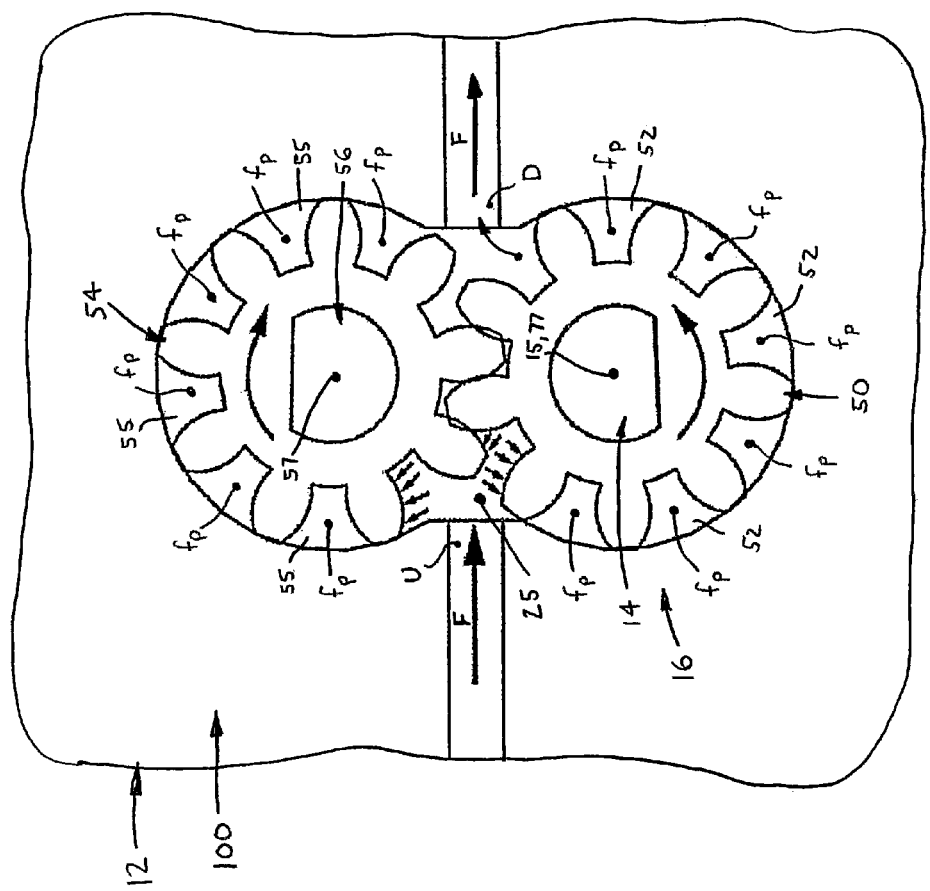
FIG. 20 is an enlarged view of a portion of FIG. 19.
Figure 23:
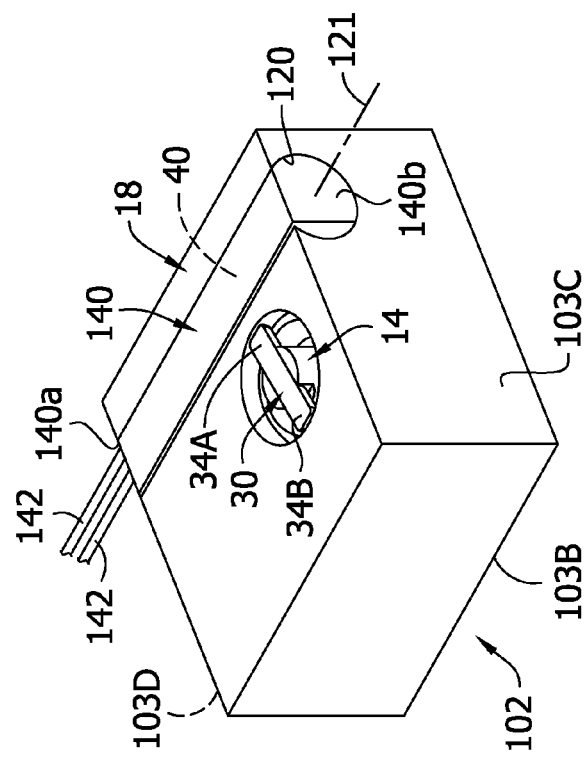
FIG. 23 is a cross-sectional view through line 23-23 of FIG. 17.
Figure 24:
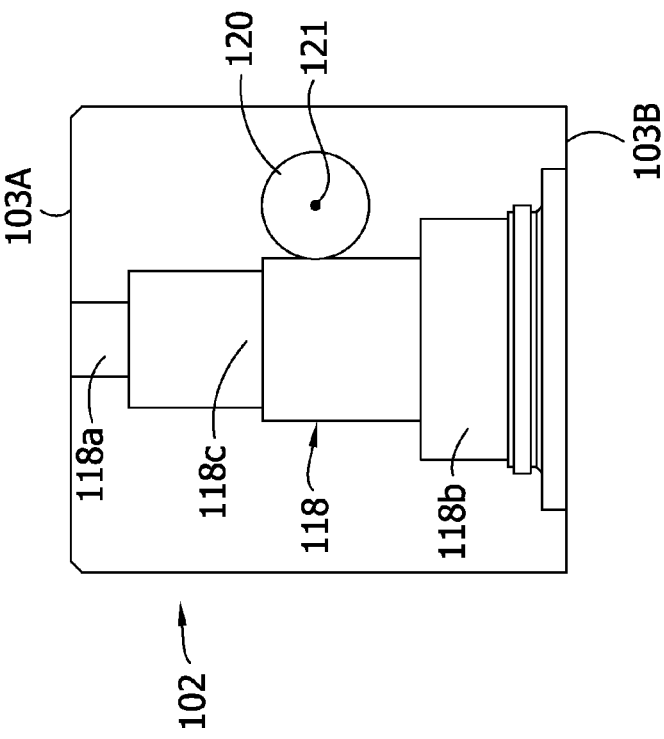
FIG. 24 is a cross-sectional view through line 24-24 of FIG. 18.

Referring now to FIGS. 1, 8, 9, 15-17, 19 and 20, the flow detector 16 preferably includes a cylindrical body or disk 50 having a central opening 51 sized to receive the shaft 16 and a plurality of cavities 52 spaced circumferentially about the central axis 15. Most preferably, the detector disk 50 is generally formed as a conventional gear wheel (e.g., as a spur gear), but may alternatively be formed as a paddle wheel or any other appropriate structure capable of functioning generally as described herein. As best shown in FIGS. 16 and 20, each cavity 52 is at least partially fillable with a portion $f_P$ of the fluid F such that the detector 16 transports the fluid portions $f_P$ through the flow passage measuring section 25 during rotation of the disk 50 about the central axis 15. More specifically, fluid F enters the particular cavities 52 located within an upstream side U of the passage measuring section 25 at any specific instant during flow through the passage 24, and thereby exerts pressure on the disk/gear wheel 50 that generates torque about the central axis 15, causing the detector 16 and shaft 14 to rotate about the axis 15. The fluid portions $f_P$ within the cavities 52 are carried by the disk 50 until reaching a downstream side D of the passage section 25, at which point the fluid portions flow out of the cavities 52, assisted by centrifugal force generated by the rotating disk 50, and into the passage section 25.

In a first construction of the flow measuring device 10, as shown in FIGS. 1, 8, 9 and 15, the flow detector 16 is a single disk or gear wheel 50 that rotates independently of any components not mounted coaxially on the shaft 14 and conveys substantially the entire volume of fluid F flowing through the passage section 25. More specifically, the disk/gear wheel 50 substantially obstructs the passage measuring section 25, as described in detail below, such that essentially the entire volume of fluid F flowing through the passage 14 is carried by the wheel 50 through the passage section 25. In other words, substantially all of the fluid F traversing the passage measuring section 25 is carried within the disk cavities 52 as opposed to flowing around the perimeter of the wheel 50. As such, the angular displacement of the flow detector 16 more closely correlates with the actual volume of fluid F flowing through the passage 24. Such an arrangement is more accurate than a "paddle wheel" arrangement in which a rotatable detector (not shown) is only partially disposed in a flow passage such that a substantial portion of a fluid flows past the detector without contact. Particularly with a highly viscous fluid (e.g., grease), the flow rate of a fluid across a radial cross-section of a passage may vary, for example, a portion of the flow may shear and move at a greater or lesser rate than another portion of the flow, which would not be ascertained by a detector only partially inserted into the passage.

In a second, presently preferred construction of the flow measuring device 10, depicted in FIGS. 17-25, the flow measuring device 10 further comprises a second, "idler" gear wheel 54 having a plurality of cavities 55 and being disposed on a rotatable shaft 56 spaced from the shaft 14, the shaft 56 being rotatable about an axis 57 generally parallel with the axis 15. The idler wheel 54 is located at least partially within the flow measuring section 25 and is meshed with the detector gear wheel 50. With this structure, fluid F flowing into the measuring passage section 25 is divided so as to flow about the a portion of the perimeter of each gear wheel 50 and 54, although only rotation of the shaft 14 is detected and monitored as described above. Together, the disk/gear wheel 50 and the idler gear wheel 54 substantially obstruct the passage measuring section 25, described in further detail below, such that essentially the entire volume of fluid F flowing through the passage 14 is carried by the two wheels 50, 54 through the passage section 25. Thus, as with the first construction described above, substantially all of the fluid F traversing the passage measuring section 25 is carried within the cavities 52, 55 of the two disks/wheels 50, 54 as opposed to flowing around the perimeter of each disk/wheel 50 or 54, such that flow detector angular displacement more accurately correlates with the actual fluid flow volume through the passage 24. Further, the flow rate about the two disks/wheels 50, 54 is determined by directly measuring the flow through the wheels 50, 54 and then correlating the measured flow with the rotation of the shaft 14 prior to operation of the flow measuring device 10.

Referring to FIGS. 1-3, 10, 13 and 14, in the first flow measuring device construction, the housing 12 preferably includes a generally rectangular block 60 having a first through hole 62 extending between front and rear surfaces 61A, 61B and providing the flow passage 24, a second through hole 64 extending between top and bottom surfaces 61C, 61D, respectively, for installation of the flow detector assembly 17, and a third through hole 66 extending between the left and right side surfaces 62E, 62F, for installation of the sensor 18. More specifically, the first or "flow passage" hole 62 includes a front, radially-larger outer bore section 68 extending inwardly from the block front surface 61A, a rear, radially-larger outer bore section 69 extending inwardly from the block rear surface 62B, a central, radially-smaller inner bore section 70 extending between and connecting the front and rear outer bore sections 68, 69 and providing the passage measuring section 25, and a centerline 71 extending between the front and rear surfaces 61A, 61B. Preferably, the front bore section 68 is adapted to receive a male coupler 2 (in phantom—FIG. 13) of the lubricant line first section 1a and the block 60 has a generally circular cylindrical projection 72 extending from the rear surface 61A and providing a male coupler for fluidly connecting with a female coupler 3 (in phantom—FIG. 13) of the lubricant line second section 1b, the rear outer bore section 69 extending through the projection 72.

Referring to FIGS. 4, 5, 11 and 15, the second or "detector installation" hole 64 includes an upper, radially-larger outer bore section 74 extending inwardly from the block top surface 61C, a lower, radially-larger outer bore section 75 extending inwardly from the bottom surface 61D and a central, radially-smaller "stepped" inner bore section 76 extending between and connecting the upper and lower bore sections 74, 75. The detector installation through-hole 64 has a centerline 77 that is substantially collinear with the shaft axis 15 when the shaft 14 is installed within the block 60. The installation hole centerline 74 extends generally perpendicular to, but is spaced a distance $A_S$ from, the flow passage centerline 67, as depicted in FIG. 15. The spacing distance $A_S$ is lesser than the radius $R_B$ of the upper bore section 74 such that a lower portion of the upper bore section 74 intersects or "cuts through" the central inner bore section 70 of the flow passage hole 62. As such, when the detector assembly 17 is installed within the hole 64, a portion of the detector body 50 is disposed within the flow passage 24 and substantially obstructs the passage measuring section 25.

More specifically, the upper bore section 74 is generally circular and is sized diametrically so as to receive the detector body 50 with a minimal annular clearance between the perimeter of the body 50 and an inner circumferential surface 74a (FIG. 11) of the bore section 74. The bore lower end provides an annular radial surface 74b (FIG. 11), the detector body 50 being generally disposed against the radial surface 74b so as minimize axial clearance between the flow detector 16 and the bore section 74. Preferably, at least the portion of the upper bore inner surface 74a above the flow detector 16 is threaded to receive a first threaded plug 80, as described below. Further, the lower bore section 75 is generally circular and is sized diametrically so as to receive the magnet rod 32 with sufficient clearance to permit free rotation of the magnet 30. The lower bore section 75 has an inner circumferential surface 75a, at least the lower portion of which is threaded to receive a second threaded plug 82, described below. Furthermore, the stepped central bore section 76 has an upper portion 76a sized to receive a circular sealing member 84, preferably an O-ring, to prevent leakage into the lower bore section 75, an annular shoulder 76b sized to rotatably support the shaft 14, and a lower portion 76c sized to receive an upper end of a preferred shaft rod 78, as described below.

Referring to FIGS. 6 and 10-12, the third or "sensor" hole 66 is preferably substantially circular and is located so as to position the sensor switch 40 proximal to the first angular position $A_1$ of the magnet 30. More specifically, the sensor hole 66 has a centerline 67 extending generally perpendicularly between the left and right side surfaces 61E, 61F and a substantially constant inside diameter (not indicated) at all points along the centerline 67. Further, the sensor hole 66 is spaced generally below the front bore section 68 of the flow passage hole 62 and extends generally adjacent to the lower bore section 75 of the installation hole 64, as best shown in FIG. 10. As such, when the sensor 18 is installed within the hole 66, the sensor switch 40, which is preferably centrally located within a sensor body 100, is positioned such that the magnetic field of either magnet rod end 34A or 34B, i.e., the north and south pole N, S, exerts a sufficient force to affect or adjust the switch 40 when the rod end 34A, 34B is at or proximal to the first angular position $A_1$, but not when the two ends 34A, 34B are both proximal to the second or fourth angular positions $A_2$, $A_4$.

Referring now to FIGS. 17-24, in the second, presently preferred construction of the flow measuring device 10, the housing 12 preferably includes a base 100 providing the flow passage 24 and containing the flow detector 16, a sensor block 102 mounted to a lower side of the base 100 and housing at least a portion of the detector assembly 17 and the sensor 18, and a cover 104 mounted to an upper side of the base 100 and providing access to the flow detector 16. The base 100 includes a through hole 106 extending between front and rear surfaces 101A, 101B and providing the flow passage 24 and upper and lower, generally rectangular pockets 108A, 108B extending inwardly from top and bottom surfaces 101C, 101D, respectively and transversely between side surfaces 101E, 101F. A double lobe-shaped through hole 110 and four coupler through holes 112 extend between upper and lower pocket surfaces 109A, 109B, the lobe-shaped hole 110 intersecting with the flow passage through hole 106 and providing the flow measuring section 25.

More specifically, the "flow passage" hole 106 includes a front, radially-larger outer bore section 107 extending inwardly from the block front surface 101A, a rear, radially-larger outer bore section 109 extending inwardly from the block rear surface 101B, a two central, radially-smaller inner bore sections 111A, 111B each extending between a separate outer bore section 101A, 101B and the lobe-shaped hole 110, and a centerline 113 extending between the front and rear surfaces 101A, 101B. Preferably, the front bore section 107 is adapted to receive a male coupler (not shown) of the lubricant line first section 1a and the rear bore section 109 is adapted to receive a male coupler (not shown) of the lubricant line second section 1b. Further, the lobe-shaped detector hole 110 has a first partially-circular section 114 for receiving the detector body/wheel 50 and a second partially-circular section 116 for receiving the idler wheel 54, each section 114, 116 being sized diametrically such that there is minimal annular clearance between the perimeter of each wheel 50, 54 and a partially circular inner surface of each section 115, 117, respectively, of each hole section 114, 116.

Referring to FIGS. 17, 18, 23 and 24, the sensor block 102 has a stepped "shaft" through-hole 118 extending between top and bottom surfaces 103A, 103B for installation of portions of the detector assembly 17, a "sensor" through hole 120 extending between left and right side surfaces 103C, 103D for installation of the sensor 18, and four threaded fastening holes 122 (FIG. 17; only three shown) extending inwardly from the top surface 103A. The shaft hole 118 is located on the sensor block 102 such that the hole 118 is substantially collinear with the first circular lobe section 114 of the detector hole 110 when the sensor block 102 is connected with the base 100, as described below. Further, the shaft hole 118 has an upper, generally circular collar section 118a for rotatably supporting an upper portion of the shaft 14, a lower generally circular section 118b for receiving a bearing 132 of a preferred sensor assembly 17, as described below, and a central generally circular section 118c within which the magnet 30 is rotatably disposed. Furthermore, the sensor hole 120 is preferably substantially circular and is located so as to position the sensor switch 40 proximal to the first angular position $A_1$ of the magnet 30.

More specifically, the sensor hole 120 has a centerline 121 extending generally perpendicularly between the left and right side surfaces 103C, 103D and a substantially constant inside diameter (not indicated) at all points along the centerline 121, and extends generally adjacent to the central section 118c of the shaft hole 118. Thereby, when the sensor 18 is installed within the hole 120, the sensor switch 40, which is preferably centrally located within a sensor body 140, is positioned such that the magnetic field of either magnet rod end 34A or 34B, i.e., the north and south pole N, S, exerts a sufficient force to affect or adjust the switch 40 when the rod end 34A, 34B is at or proximal to the first angular position $A_1$, but not when the two ends 34A, 34B are both proximal to the second or fourth angular positions $A_2$, $A_4$ (see FIG. 7).

Figure 17:
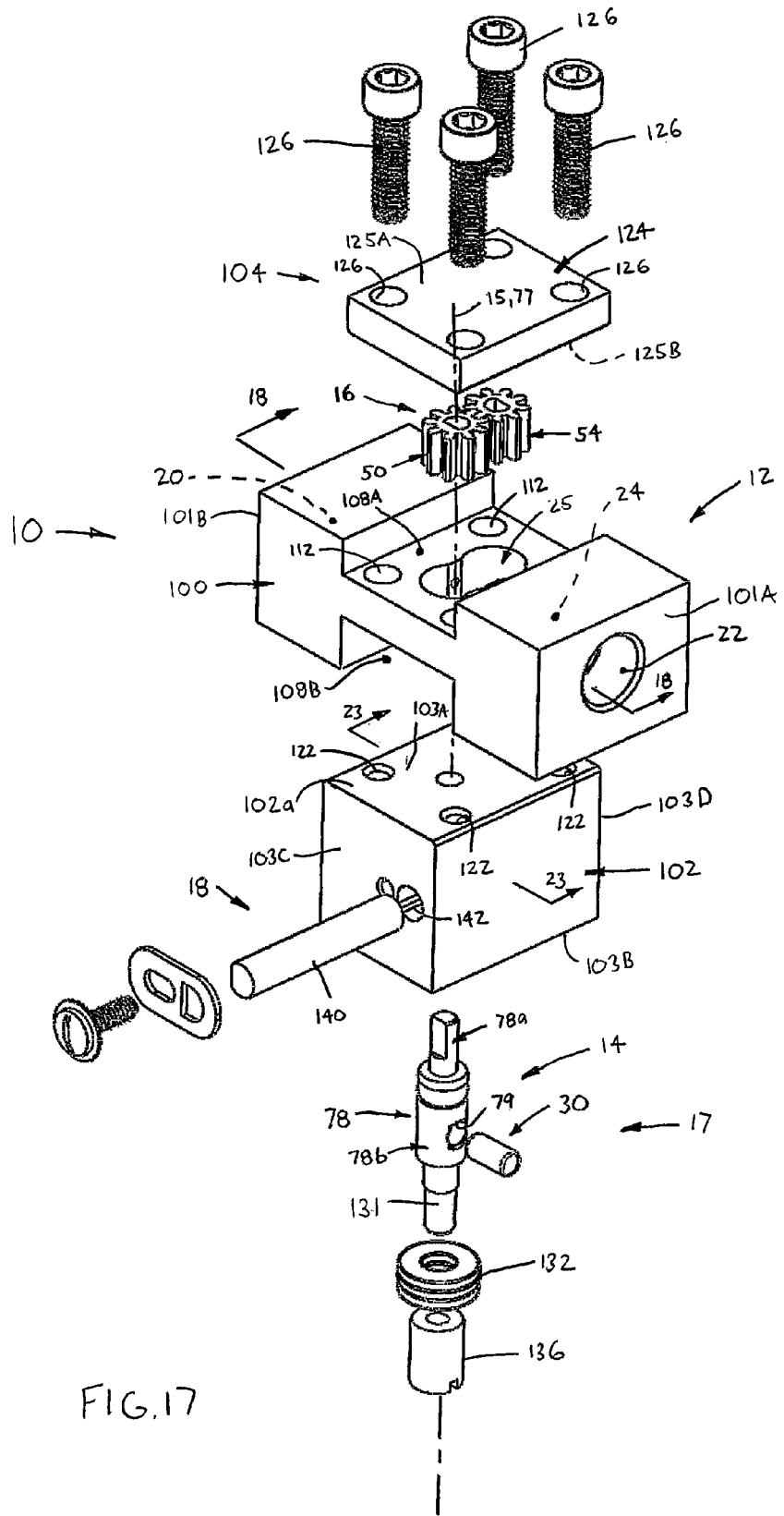
FIG. 17 is an exploded view of a flow measuring device in accordance with a second preferred construction of the present invention.

Referring particularly to FIG. 17, the cover 104 preferably includes a generally rectangular block 124 having four clearance holes 126 extending between top and bottom surfaces 125A, 125B. The cover block 124 is disposable within the upper pocket 108A of the base 100 such that each one of the cover clearance holes 126 is alignable with a separate one of the base coupler holes 112. Further, an upper end 102a of the sensor block 102 is sized to fit within the lower pocket 108B such that each one of the block fastening holes 122 is alignable with a separate one of the base coupler holes 112. When the cover 104 and sensor block 102 so positioned on the base 100, a threaded fastener 126 is inserted through each of the four set of aligned holes 126, 112, 122 so as to connect the cover 104 and the sensor block 102 to the base 100, thereby enclosing the preferred two disks/wheels 50, 54 within the flow measuring section 25 of the base 100.

Referring now to FIGS. 1, 4, 5, 8, 9, 17, 18 and 25, as mentioned above, the shaft 14 of the detector assembly 17 preferably includes a "stepped" circular cylindrical rod 78 having an upper, radially-smaller section 78a and a lower, radially larger section 78b. The shaft upper section 78a is sized to fit within the central opening 51 of the detector body 50 so as to mount the flow detector 16 on the shaft 14. The shaft lower section 78b has a through hole 79 sized to receive the magnet rod 30 to thereby mount the magnet 30 on the shaft 14.

As shown in FIGS. 1, 4, 5, 8 and 9, in the first construction of the flow measuring device 10, the detector assembly 17 preferably includes upper and lower shaft supports 86, 88 each configured to rotatably support a separate one of the shaft ends 14a, 14b. Preferably, the upper shaft support 86 is provided by a central closed bore 90 extending axially into the first threaded plug 80 and sized to receive the shaft upper end 14a with a loose running fit. Further, the lower shaft support 88 is provided by a metallic ball 92 disposed within a closed central bore 93 extending axially into the second threaded plug 82, the shaft second end 14b being seated upon an upper end of the ball 92 so as to rotate thereagainst.

Further, the first and second plug members 80, 82, besides functioning to support the detector assembly shaft 14, also function to each enclose a separate end 64a, 64b of the installation through hole 64. Each plug member 80, 82 includes a generally circular cylindrical body 94 having opposing, inner and outer ends 94a, 94b, respectively, and a threaded outer circumferential surface 95, and a hexagonal head 95 at the outer end 94b of the cylindrical body 94, each plug bore 90, 93 (described above) extending inwardly from the body inner end 94a. When the detector assembly 17 is installed in the housing 12, the first plug member 80 is threadably engaged with the upper bore section 74 of the installation hole 64, and a circular sealing member 96 (e.g., an O-ring) is preferably disposed between the first plug head 95 and the housing upper surface 61C, most preferably within an annular slot 97 in the head 95. After the first plug 80 is fully seated within the bore section 74, the detector body 50 is loosely sandwiched between the plug inner end 94a and the bore end radial surface 74b, which reduces the space about the detector body 50 to ensure fluid is transported by the detector 16 and as opposed to leaking around the body 50. Further, the second plug member 82 is threadably engaged with the lower bore section 75 of the installation hole 60 such that the head 95 is seated against the housing lower surface 61D. When the second plug 82 is seated within the bore section 75, the ball 92 contacts the shaft second end 14b to rotatably support the shaft 14.

Figure 25:
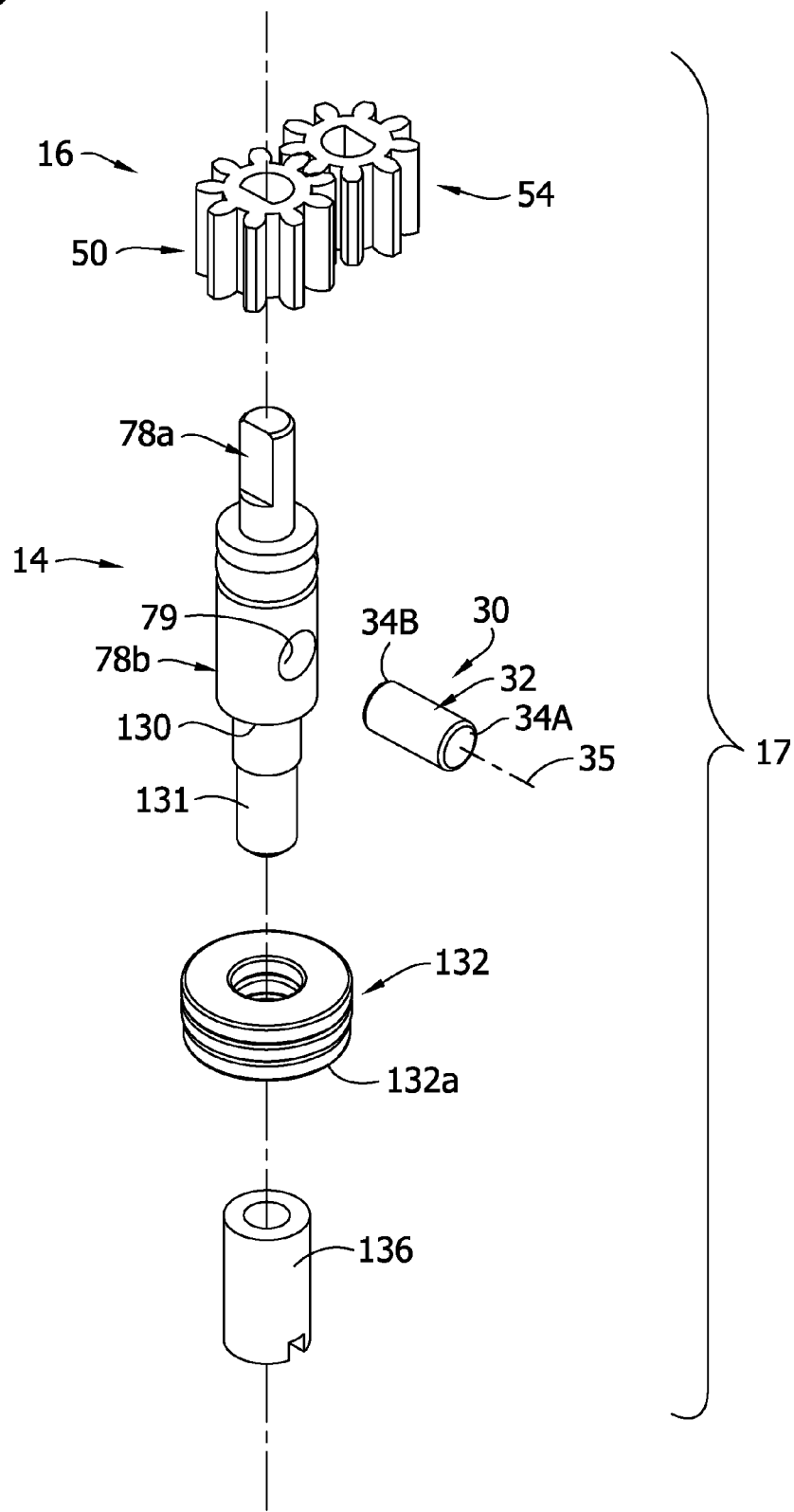
FIG. 25 is an enlarged, exploded view of a detector assembly.

Referring now to FIGS. 17, 18 and 25, in the second construction of the flow measuring device 10, the lower section 78b of the shaft cylindrical rod 78 has a central shoulder 130 and a bottom threaded portion 131. A bearing 132 is disposable on the rod lower portion 78b between the shoulder 130 and the threaded portion 132 and rotatably supports the shaft 14. Further, a circular clip or "C-clip" 134 is disposed within an annular groove 135 extending outwardly from the shaft hole lower section 118c and seats against the bottom surface 132a of the bearing 132. Furthermore, a nut 136 is threaded onto the shaft threaded portion 131 until pressing against the bottom surface 132a of the bearing 132, thereby securing the detector assembly 17 within the sensor block 102.

Referring to FIGS. 1, 2, 6-8, 17 and 24, the preferred sensor 18 includes a generally cylindrical body 140 housing the elements of the reed switch 40 and having opposing axial ends 140a, 140b, and a pair of electrical lines 142 (e.g., wires) extending from one end 140a of the body 140. As reed switches are well known in the sensing technology, a detailed description of the sensor 18 is unnecessary and beyond the scope of the present disclosure. Further, the electrical lines 142 of the sensor 18 are electrically connected with the processor 26, which may be of any appropriate type or construction, such as for example, an embedded microprocessor mounted on the housing 12 or a separate PLC, computer, etc. (none shown). In any case, the processor 26 is configured to receive the electric pulses from the switch 40 and programmed to determine or calculate the fluid flow rate through the fluid measuring device 10 and/or the total volume of fluid flow through the device 10 from the pulses received, as discussed below.

Figure 13:
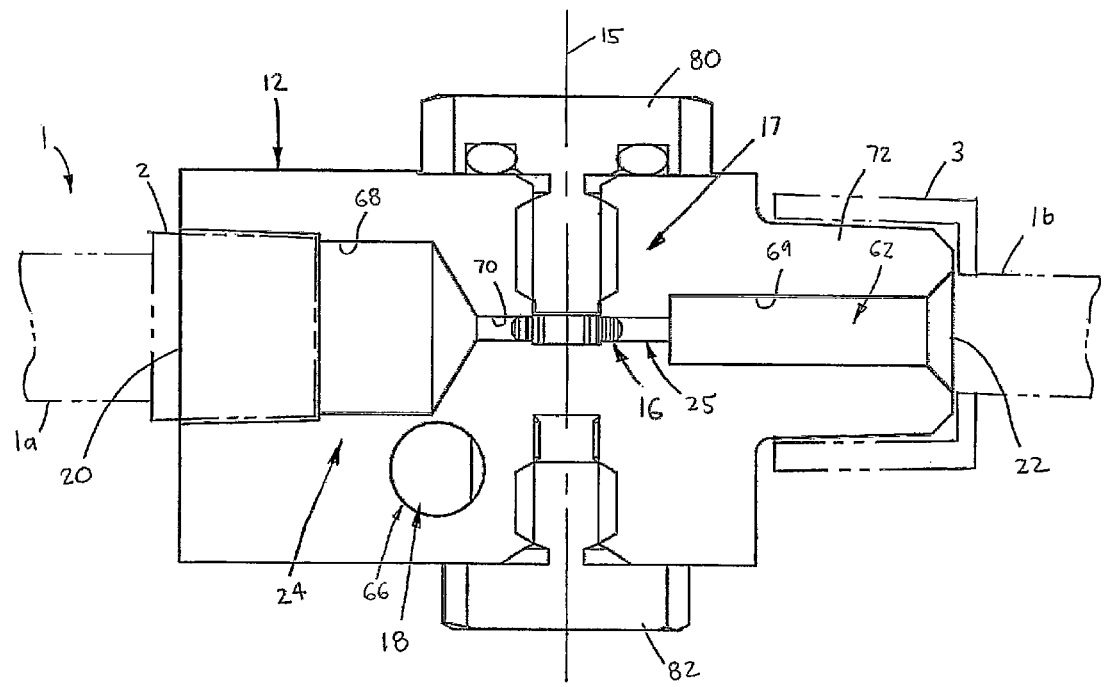
FIG. 13 is another cross-sectional view through line 3-3 of FIG. 1, showing the measuring device connected with a lubricant system and indicating flow through the device.
Figure 14:
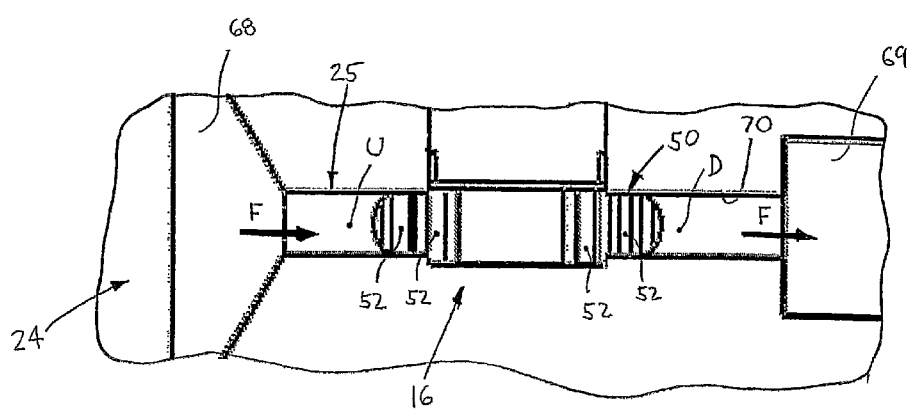
FIG. 14 is a broken-away, enlarged view of a central portion of FIG. 13.

Prior to use, the fluid measuring device 10 is fluidly coupled into a lubrication system (not depicted) by connecting the lubricant line sections 1a, 1b with the front and rear bore sections 68, 69 or 107, 109 of the flow passage 24, as depicted in FIG. 13. When the lubrication system is operational, fluid/lubricant enters the front bore section 68 or 107 and passes through into the central bore section 70 or first inner bore section 111A until reaching the passage measuring section 25. The fluid/lubricant flow F contacts the detector body/gear wheel 50, or meshed wheels 50, 54, so as to both fill those cavities 52 (and cavities 55 in the second construction) exposed to the upstream side U of the flow passage 24 and exert torque on the detector 16, thereby causing the detector 16 and shaft 14 to rotate about the shaft axis 15. As the detector 16 rotates, the concurrently rotating magnet 30 causes the switch 40 to cyclically open and close while the lubricant/fluid is transported by the detector 16 (in discrete portions $f_P$) to the downstream side D of the central passage section 25, so as to flow thereafter through the rear bore section 69 or 109 and into the lubricant line second section 1a. As the detector 16 rotates, different portions of the detector body 50, and of the idler wheel 54 in the second construction, rotate through the passage measuring section 25, such that the plurality of cavities 52 (and cavities 55) are sequentially filled on the upstream side U and vacated on the downstream side D to provide a generally continuous flow of the fluid/lubricant.

The pulses generated by the cyclically opening and closing switch 40 are continuously transmitted to the processor 26 as lubricant flows through the fluid measuring device 10. As the amount of fluid flow required to rotate the detector 16 by ninety degrees (90°) can be readily predetermined, the total amount or volume of flow F through the passage measuring section 25, and thus through the flow detector 10, can be calculated. Further, using information from a timing circuit (not indicated), the processor 26 can correlate the fluid volume information with the angular velocity of the rotating shaft 16, determined by number of pulses per a given unit of time, to determine the fluid flow rate through the passage section 25, and thus through the flow measuring device 10.

The present fluid measuring device 10 has a number of advantages over previously known fluid detecting or measuring devices. By using a rotating wheel/gear as the flow detector 16 and a reed switch as the sensor 18, the fluid measuring components of the flow measuring device 10 are relatively simple to manufacture, and thus relatively low cost, and robust under all potential operating temperatures. In particular, the reed switch sensor 18 is a relatively inexpensive and simple device that can operate within a wide range of temperatures. Further, by utilizing a gear wheel 50 as the detector 16 and arranging the wheel 50 to substantially obstruct the fluid passage 24, the flow measuring device 10 is more accurate than many previous devices as substantially all of fluid flow must be transported by the detector 16. This feature is particularly important with higher viscosity lubricants which could otherwise shear and flow around a previous known detector without being detected.

Figure 26:
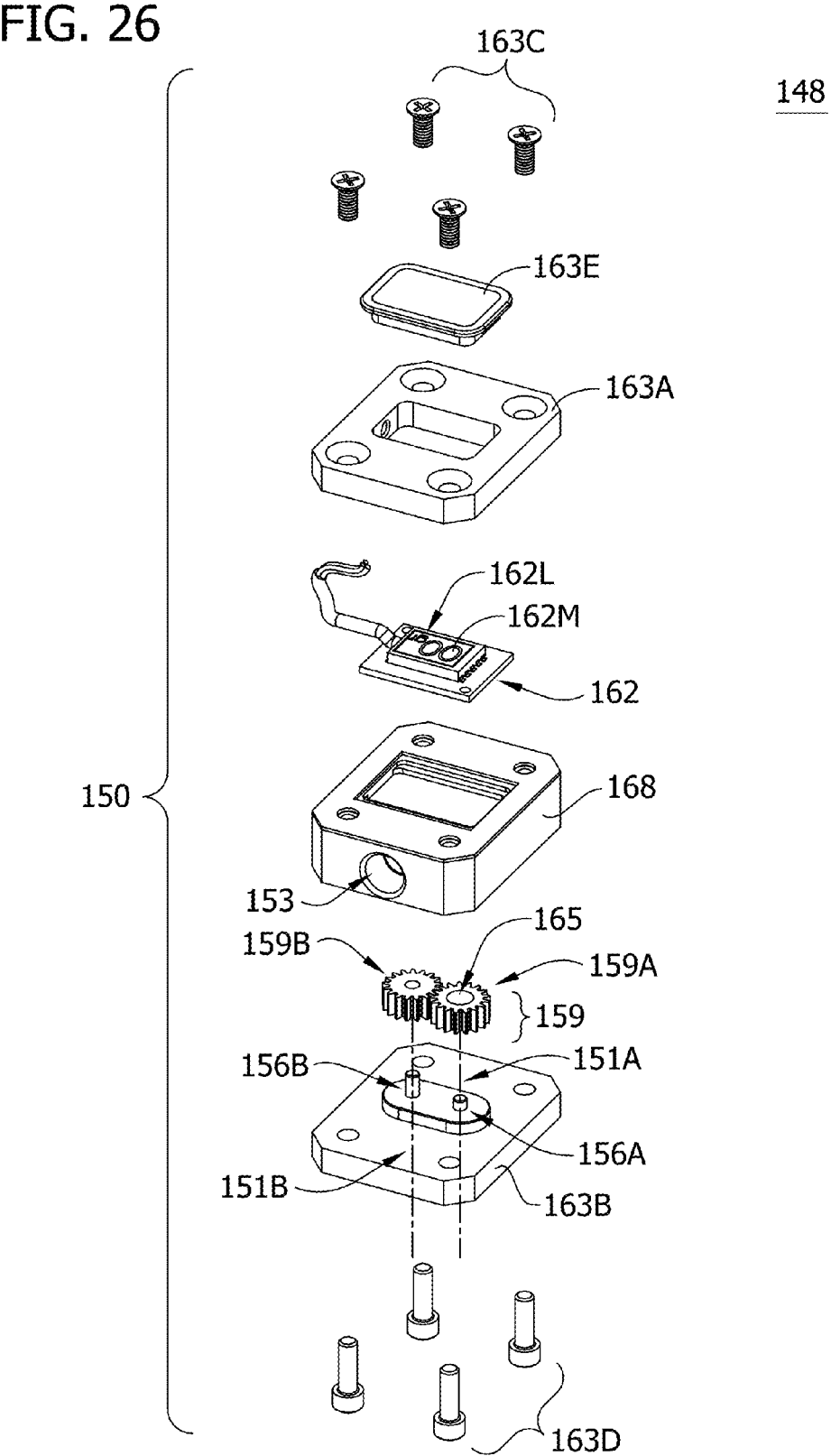
FIG. 26 is an exploded view of a flow measuring device with a polar magnet mounted on a spur gear in accordance with a third preferred construction of the present invention.

FIG. 26 is an exploded view of a flow measuring device 148 in accordance with a third preferred construction of the present invention. FIG. 26 includes housing 150 having an inlet 153, a first stationary shaft 156A disposed within the housing 150 and having a first central axis, 151A, a second stationary shaft 156B disposed within the housing 150 and having a second central axis 151B, and a flow detector 159 comprising a spur gear 159A mounted on the first stationary shaft 156A. A magnet 165 is mounted on the spur gear 159A of the flow detector 159 and is configured to rotate simultaneously with the flow detector 159 about the first central axis 151A and the second central axis 151B resulting in a detectable rotation of the magnetic field of the magnet 165. A sensor 162 is disposed within the housing 150 and configured to sense rotation of the magnetic field of the magnet 165 which rotates simultaneously with the flow detector 159 as fluid flows past the flow detector 159. Fluid flow causes the flow detector 159 to angularly displace about the first central axis 151A and the second central axis 151B. The sensor 162 detects angular displacement of the magnetic field of the magnet 165 which corresponds to and is indicative of rotation of flow detector 159 which is indicative of flow, flow rate, and volume of the fluid through the passage 177.

Still referring to FIG. 26, in an embodiment, a non-ferrous partition 168 forms at least part of the housing 150, and the flow detector 159 comprises a spur gear 159A interlocked and opposed by an additional spur gear 159B. As fluid flows past the flow detector 159, pressure is exerted on the flow detector 159 and torque is generated about the first central axis 151A and the second central axis 151B, causing the detector 159 to rotate about the first central axis 151A and the second central axis 151B, in a manner as indicated, as similarly described with reference to FIG. 19 and FIG. 20. In one embodiment, the spur gear 159A is interlocked and opposed by the additional spur gear 159B resulting in a direct measurement of the fluid flow through the passage by the flow detector 159. Alternatively, the flow detector 159 may be only one, single gear such as similarly illustrated in FIGS. 15-16.

The magnet 165 comprises a polar magnet on the spur gear 159A, and the sensor 162 comprises a magnetic encoder 162M configured to evaluate the rotation angle of the polar magnet 165. The magnetic encoder 162M is positioned on the partition 168 so that the partition 168 is between the magnetic encoder 162M and the magnet 165. The partition 168 supports the magnetic encoder 162M adjacent the magnet such that the magnetic field of the magnet passes through the non-ferrous partition 168 and is detectable by the magnetic encoder 162M. In an embodiment, the sensor 162 further comprises an indicator LED 162L, which is further described below. A cover 163A secures the non-ferrous partition 168 to a base 163B by screws 163C secured to screw housings 163D. In an embodiment, a cover 163A further comprises an interior cover 163E. In an embodiment, the interior cover 163E is transparent to allow for the operations of the indicator 162L to be visible, as further described below. In an embodiment, the interior cover 163E is constructed of glass or a similar transparent material.

Figure 27:
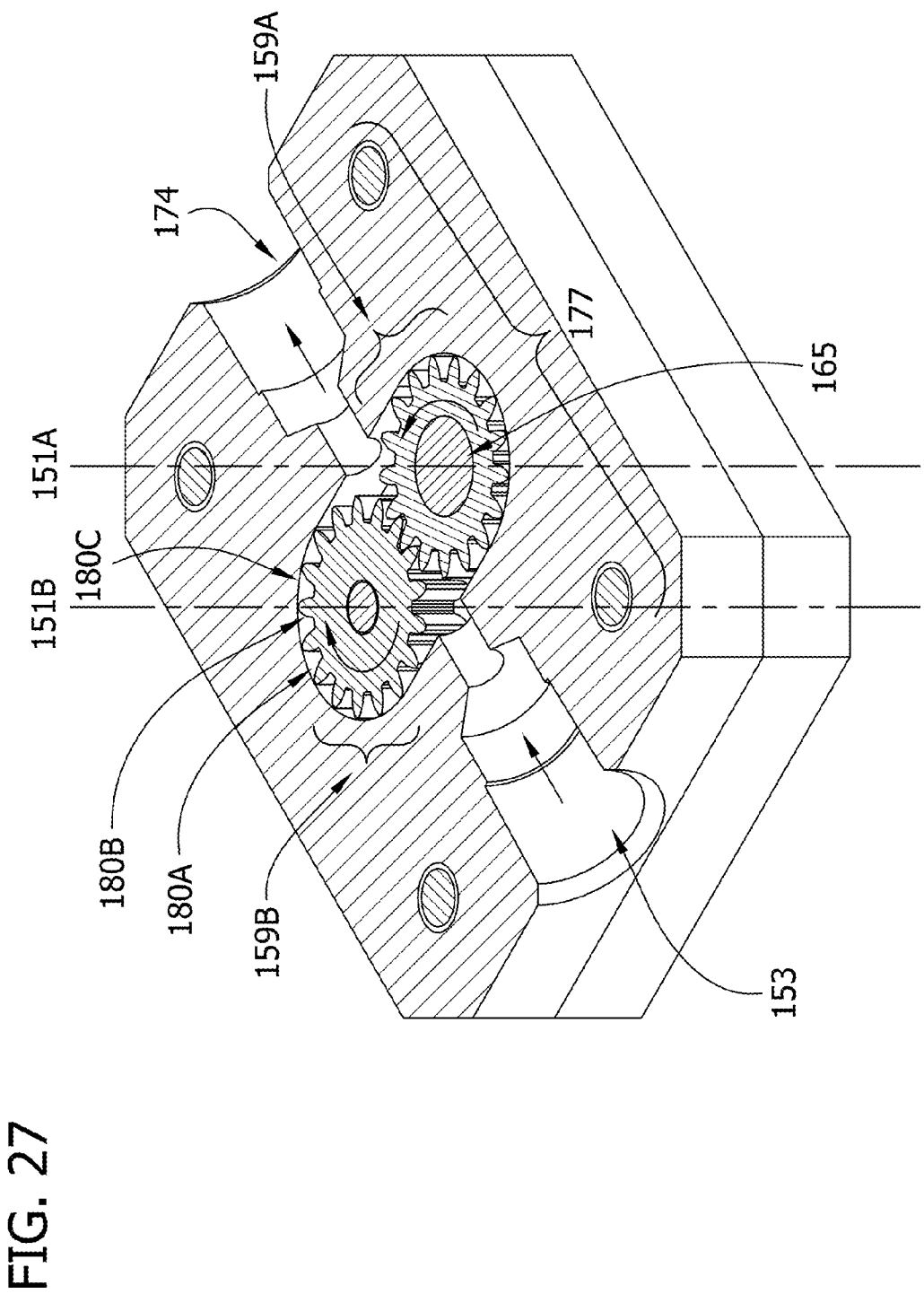
FIG. 27 is a cross-sectional view of a portion of the flow measuring device of FIG. 26.

FIG. 27 is a perspective, cross-sectional view of a portion of a flow measuring device in accordance with a third preferred construction of the present invention. FIG. 27 includes the inlet 153, an outlet 174 and a passage 177 extending between the inlet 153 and the outlet 174 such that spur gear 159A rotates about first central axis 151A and additional spur gear 159B rotates about second central axis 151B as fluid enters the particular cavities 180 in order to maintain a pressure balance. The flow detector 159 comprising the spur gear 159A and the additional spur gear 159B is disposed at least partially within the passage 177 such that the fluid flows through the passage at a linear flow rate which directly correlates to the angular rotation of the magnetic field which corresponds to the rotation of the spur gears as fluid flows through the passage. The fluid flows through the passage in a manner that is directly proportional to an angular rotation of the spur gear 159A about the first central axis 151A and the angular rotation of the additional spur gear 159B about the second central axis 151B such that fluid flow through the passage 177 rotates the flow detector 159 about the first central axis 151A and the second central axis 151B. The rotating motion of the spur gear 159A and the additional spur gear 159B is directly proportional to the fluid flow because the volume contained within the wall of the passage 177 and each of the cavities 180 is the same for each cavity 180.

Still referring to FIG. 27, in an embodiment, the flow detector 159 has a plurality of cavities 180A, 180B, 180C spaced circumferentially about the central axis, wherein each cavity 180 is at least partially fillable with a portion of the fluid such that the flow detector 159 comprising the spur gear 159A and the additional spur gear 159B transports the fluid portions through the flow passage 177 section during rotation about the first central axis 159A and the second central axis 159B. Most preferably, the flow detector 159 is generally formed as a conventional gear wheel (e.g., as a spur gear), but may alternatively be formed as a paddle wheel or any other appropriate structure capable of functioning generally as described herein.

Figure 28:
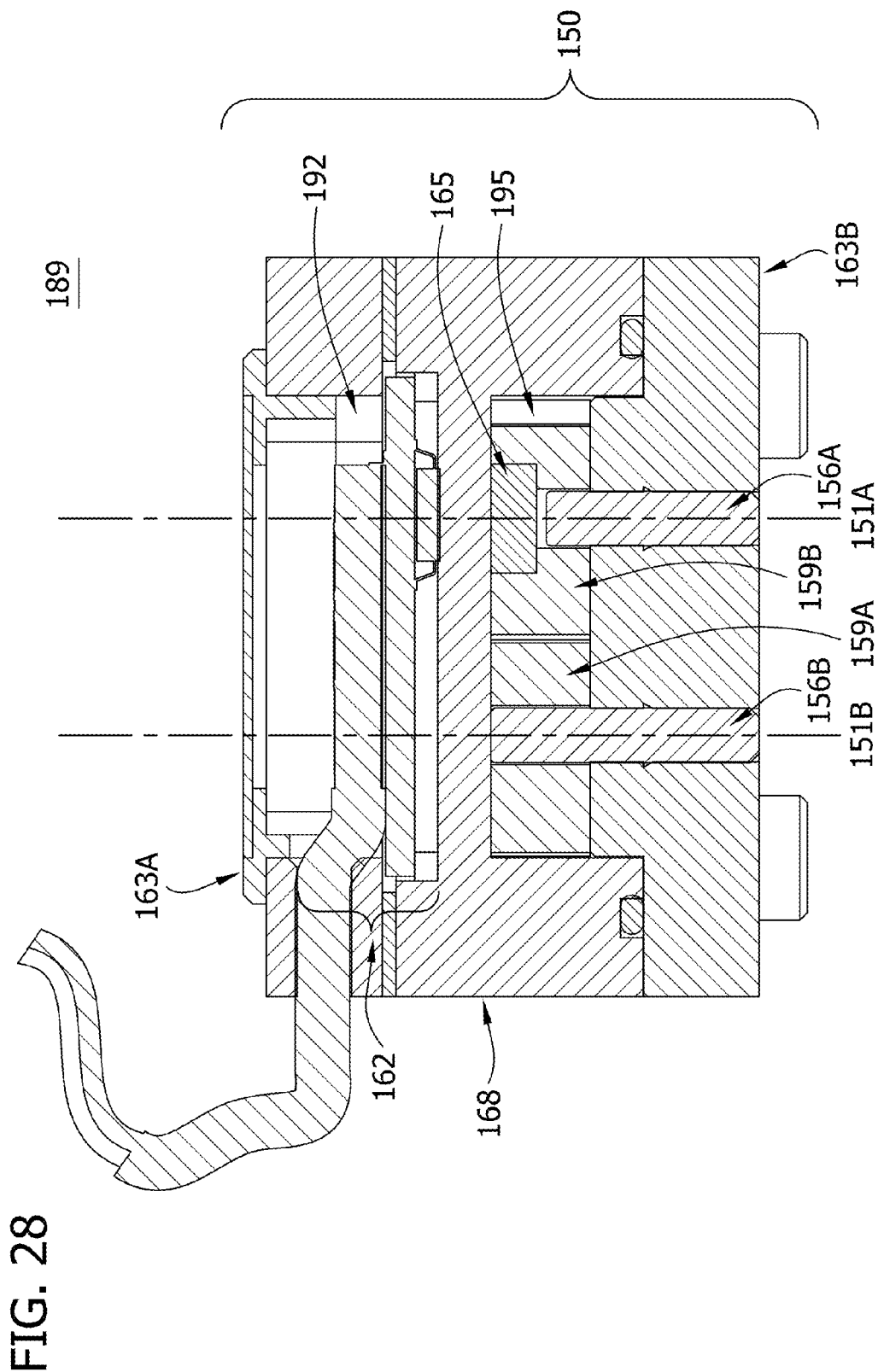
FIG. 28 is a cross-sectional view of the measuring device of the third preferred construction.

FIG. 28 depicts a cross-sectional view of the measuring device 189 of the third preferred construction. The measuring device 189 further comprises a sensor chamber 192 and a flow chamber 195. The sensor chamber 192 provides an area for the sensor 162 to reside within the housing 150. The non-ferrous partition 168 provides a separation between the sensor chamber 192 and the flow chamber 195. The flow chamber 195 is formed by the space provided between the base 163B and the non-ferrous partition 168. The first stationary shaft 156A and the second stationary shaft 156B extend through the base 163B in order to provide support for the spur gear 159A and the additional spur gear 159B to rotate on the first central axis 159A and the second central axis 159B as the fluid flows. In an embodiment, the rotation of the spur gear 159A and the additional spur gear 159B on the first central axis 159A and the second central axis 159B is assisted by the lubrication flowing through the flow detector 159.

With further reference to FIG. 28, in an embodiment, the first stationary shaft 156A and the second stationary shaft 156B rotate with the spur gear 159A and the additional spur gear 159B on the first central axis 159A and the second central axis 159B as the fluid flows. In an embodiment, the spur gear 159A and the additional spur gear 159B rotate on the first central axis 159A and the second central axis 159B. In a further embodiment, the rotation of the first stationary shaft 156A and the second stationary shaft 156B is assisted by the use of bearings positioned on the shaft (not shown). Alternatively, the rotation of the first stationary shaft 156A and the second stationary shaft 156B is assisted by the lubrication flowing through the flow detector 159. With further reference to FIG. 28, the magnet 165 is mounted on the spur gear 159A of the flow detector 159. The sensor 162 is positioned on the partition 168 so that the partition 168 is between the sensor 162 and the magnet 165. The cover 163A secures the non-ferrous partition 168 to the base 163B.

Figure 29:
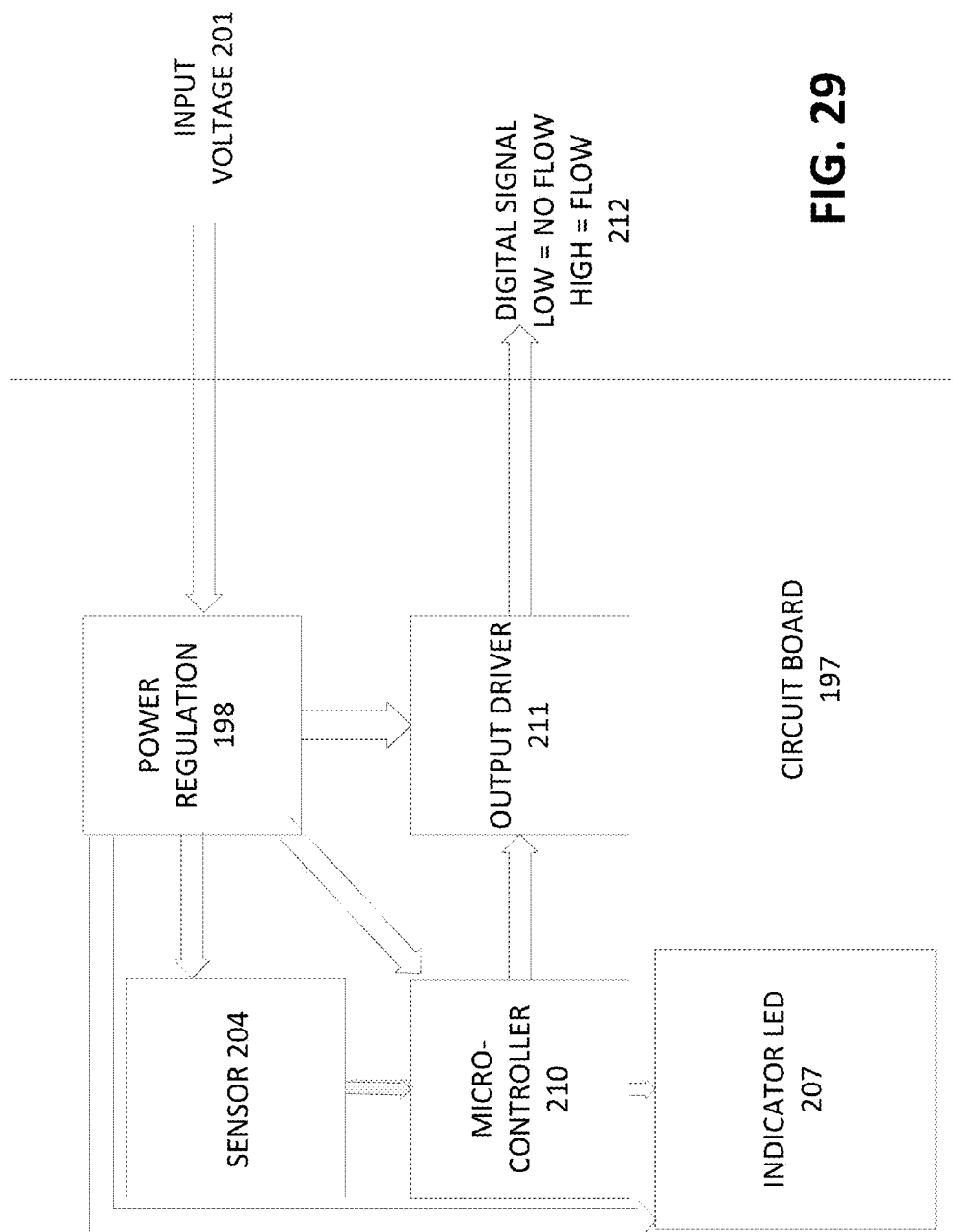
FIG. 29 is a block diagram depicting functional aspects of a rotary magnetic flow sensor PCB of the third preferred construction.

FIG. 29 is a block diagram depicting one embodiment of aspects of a rotary magnetic flow sensor circuit such as a printed circuit board (PCB) 197 of the third preferred construction. A power regulator 198 receives an input voltage 201 and provides regulated power to components of the PCB 197. A sensor 204 of the PCB 197 detects the magnetic field of the magnet 165 (not shown in FIG. 29). In an embodiment, the sensor 204 comprises a magnetic encoder model number AS5050, manufactured by AMS. An indicator 207 is activated by an output from a processor 210 to indicate that the sensor 204 is detecting a rotating magnetic field. In an embodiment, the processor 210 comprises a microcontroller such as model number ATtiny48 manufactured by Atmel Corporation. In an embodiment, the indicator 207 comprising an indicator LED is activated and illuminated by the processor 210 to indicate the detection by the sensor 162 of a rotating magnetic field resulting from the rotation of the spur gear 159A and the additional spur gear 159B of the flow detector 159, causing the magnet 165 to rotate. The indicator 207 is inactive and not illuminated to indicate a stationary magnetic field resulting from the spur gear 159A and the additional spur gear 159B of the flow detector 159 remaining stationary, causing the magnet 165 to remain stationary. An output driver 211 receives digital output signals from the processor 210 to indicate a fluid flow, fluid flow rate, and/or fluid volume through the passage. In an embodiment, the output driver 211 receives digital output signals from the processor 210 and provides an indication in the form of a digital signal 212. In an embodiment, the digital signal 212 indicates "no flow" upon receiving a "low" digital signal as a result of detecting a substantially stationary magnetic field resulting from the spur gear 159A and the additional spur gear 159B of the flow detector 159 remaining substantially stationary. In an embodiment, the digital signal 212 indicates "flow" upon receiving a "high" digital signal as a result of the sensor 204 detecting the rotation of the spur gear 159A comprising the magnet 165 and the additional spur gear 159B of the flow detector 159.

In one embodiment, the processor 210 executes instructions stored in a memory device (not shown) connected to or embedded in the processor 210 to communicate with any other embedded system or off-the-shelf PLC controller capable of processing a digital signal in the 5 to 30 Volts DC range. The processor 210 is used to filter the signal of the sensor 204 to determine the state of the magnetic field, allowing the system to communicate the state of the sensor 204 to outside electronic systems. In an embodiment, the signal output 212 is a sourcing digital output that returns a signal voltage equivalent to the input voltage of the sensor (5 to 30 Volts DC). Returning a voltage equivalent to the input voltage of the sensor (5 to 30 Volts DC) allows the sensor 204 to automatically match the input voltage 201 of the electronic system within which it is integrated. In an embodiment, the system communicates the state of the sensor 204 to outside electronic systems by using a digital signal 212 to indicate a "Rotation" or "No Rotation" condition. In an embodiment, the system indicates a stationary magnetic field by keeping the digital output 212 and indicator 207 in an inactive state. In an embodiment, the system indicates an actively rotating magnetic field by activating the digital output 212 and indicator 207.

Still referring to FIG. 29, in an embodiment, the processor 210 is electrically coupled with the sensor 204 and is configured to execute instructions stored on a memory device (not shown) connected to or embedded in the processor 210 to determine and monitor the angular position of the polar magnet and its rate of change. In a further embodiment, the processor 210 is configured to determine at least one of a flow rate of the fluid through the passage, an indication of a flow event, and a total volume of flow of the fluid through the passage. In a further embodiment as described in greater detail below, the processor 210 is further configured to execute instructions stored on a memory device (not shown) connected to or embedded in the processor 210 to invert a portion of the range of values read from the sensor 204 to prevent ambiguous readings.

Figure 30:
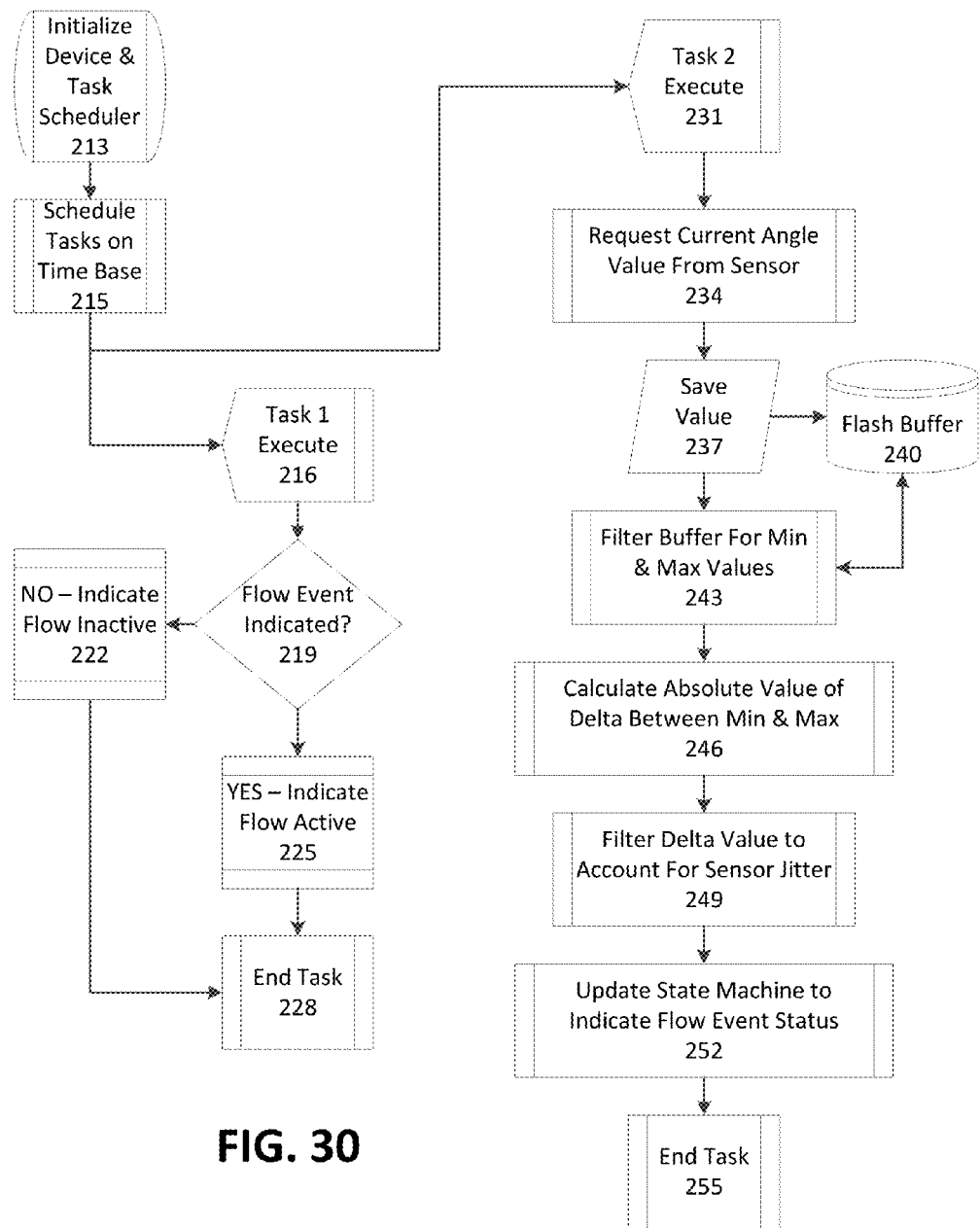
FIG. 30 is a flow chart depicting operation of the control system of the third preferred construction of the present invention.

FIG. 30 is a flow chart depicting operation of the control system of the third preferred construction of the present invention. FIG. 30 illustrates a process implemented by processor 210 executing processor executable instructions stored in a memory device (not shown) connected to or embedded in processor 210. The process begins at 213, where the processor 210 of the measuring device 148 is initialized and a task scheduler is implemented. At 215 tasks are scheduled on a time base. At 216 a first task ("Task 1") is executed, and a flow event indication is determined at 219. If the response to the determination is NO, at 222 an indication is given that the flow is inactive. If the response to the determination is YES, at 225 an indication is given that the flow is active. Regardless of the response to the determination, the first task 216 ends at 228 and the processor 210 returns to the task schedule at 215.

Still referring to FIG. 30, the process continues at 231 where a second task ("Task 2") is executed. At 234 a current angle value is requested from a sensor. The value is saved at 237 and, through a flash buffer 240, the values are filtered for minimum and maximum values at 243. At 246 a calculation of an absolute value of delta between the minimum and maximum values is determined. At 249 the delta value is filtered to account for ambiguous readings. At 252 a state machine is updated to indicate flow event status. Finally, the second task completes at 255 and the processor 210 returns to the task schedule at 215.

Figure 31:
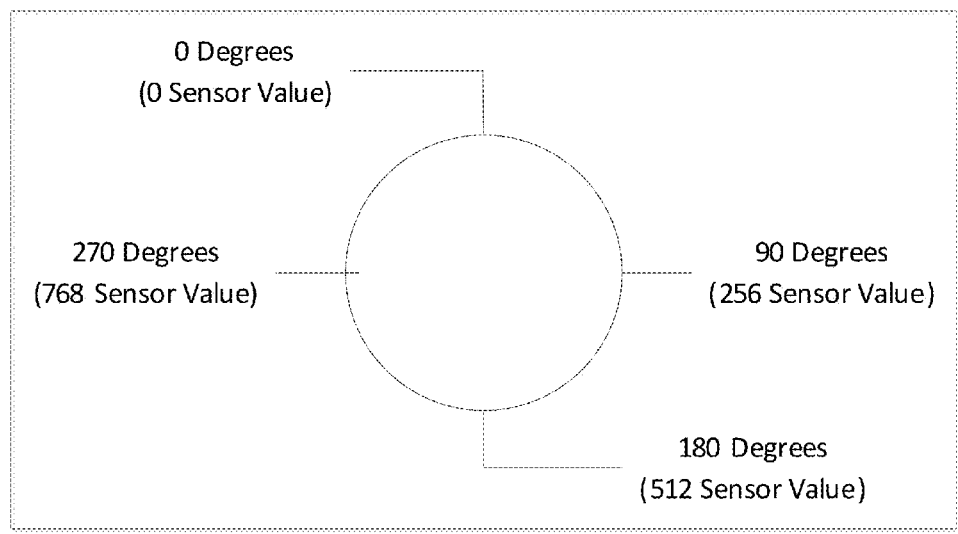
FIG. 31A is a depiction of a circular coordinate system used by the magnetic encoder of FIG. 28.
FIG. 31B is a graph depicting the linear derivation of the coordinate system of FIG. 31.
Figure 31:
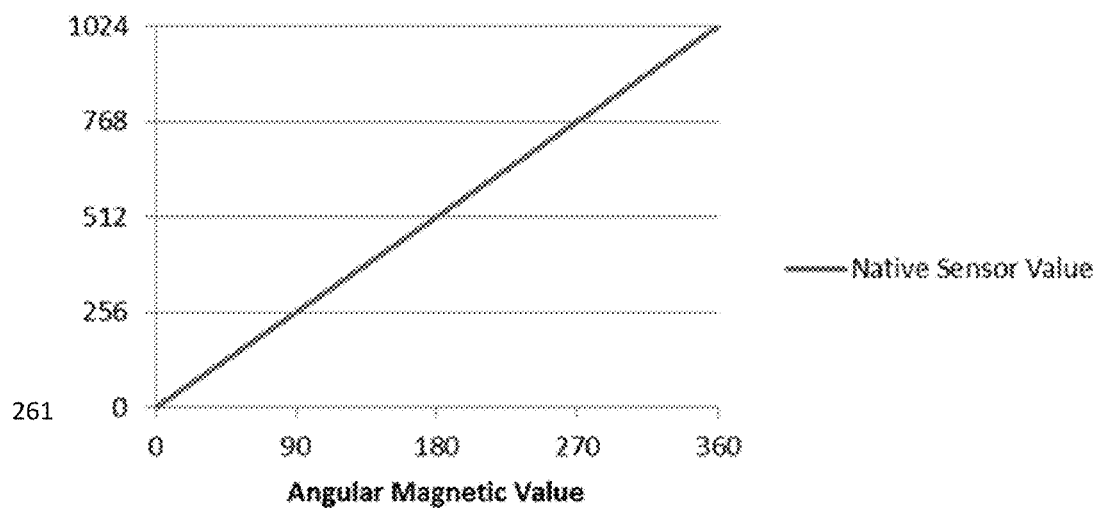

FIGS. 31A-31B, collectively FIG. 31, are depictions of the coordinate system used by the magnetic encoder of FIG. 28. FIG. 31A depicts a circular coordinate system. FIG. 31B depicts a linear derivation of the circular coordinate system of FIG. 31A. As indicated on FIG. 31A, 0° is represented by one sensor value, namely, "0 Sensor Value". Similarly, 90° is represented by "256 Sensor Value", 180° is represented by "512 Sensor Value", and 270° is represented by "768 Sensor Value", respectively. A linear derivation of the system of FIG. 31A is depicted in FIG. 31B, where 360° is represented by "1024 Sensor Value".

The models depicted in FIGS. 31A and 31B assume a static system in which one magnetic angular position, such as 0°, is represented by one sensor value, namely, "0 Sensor Value". While this correlation may be true in lab settings, the magnetic field created by the flow detector magnet is subject to real world conditions that cause minor variations (called "jitter effect") in the magnetic field, even when the magnet is at rest. Because of this reality the range of values read from the sensor must be filtered and deciphered to determine whether the minor variations constitute a stationary magnetic field or a rotational magnetic field.

Ambiguities may arise when the sensed value range is between 360° (1024 Sensor Value) and 0° (0 Sensor Value). The sensor logic has to be able to understand that if a field of 10 values is represented by five 360° Sensor Values and five 0° Sensor Values, this field represents a rotational value of 1°, not 359°. However, because of the native data format of the sensor, this may not be because of the large difference in the native data values between these two adjacent angular values.

Figure 32:
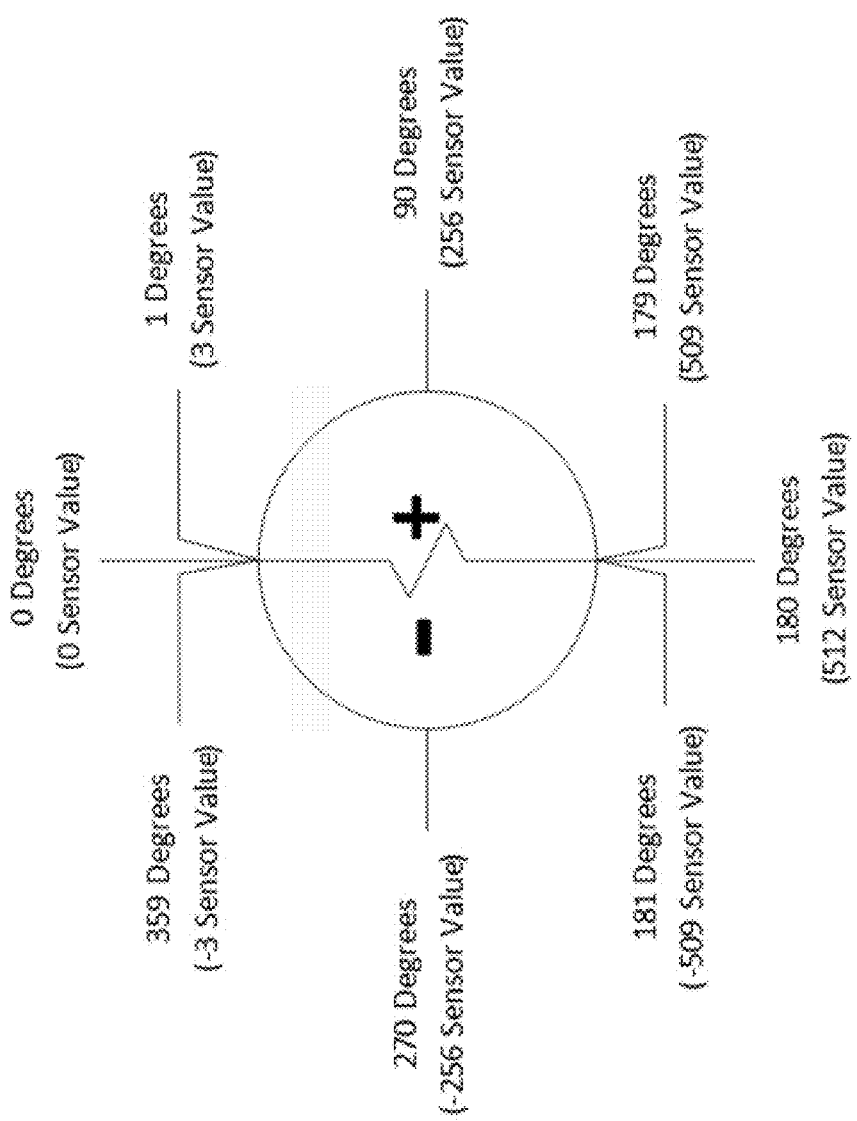
FIG. 32 depicts a diagram of a transfer function implementing an inversion of the native sensor values of FIG. 31B.

FIG. 32 depicts a diagram of a transfer function implementing an inversion of the native sensor values of FIG. 31B. In an embodiment, the control system of the present invention implements a transfer function that creates a negative inverting half circle on the 180° to 360° range. By creating a sign change on the native sensor values at the 0° and 180° boarders and by implementing an inversion of the native sensor values on the negative half circle, the absolute value of any range of coordinates can be calculated by using filtering and logic instructions. Depending on the resolution desired, a sampling frequency may vary according to a given rotational speed. For example, a sampling frequency of 100 Hertz can be used for a maximum rotational speed of 25 revolutions per second.

The Abstract and summary are provided to help the reader quickly ascertain the nature of the technical disclosure. They are submitted with the understanding that they will not be used to interpret or limit the scope or meaning of the claims. The summary is provided to introduce a selection of concepts in simplified form that are further described in the Detailed Description. The summary is not intended to identify key features or essential features of the claimed subject matter, nor is it intended to be used as an aid in determining the claimed subject matter.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium which is not a signal. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results may be attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and methods without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

What is claimed is:

1. A device for measuring flow of a fluid, the flow measuring device comprising:
    a housing having an inlet, an outlet and a passage extending between the inlet and outlet;
    a shaft disposed within the housing and rotatable about a central axis;
    a flow detector mounted on the shaft and disposed at least partially within the passage such that the fluid flows through the passage at a linear flow rate directly proportional to an angular rotation of the flow detector about the central axis and such that fluid flow through the passage rotates the flow detector about the central axis, wherein the flow detector includes a rotatable, generally cylindrical body that rotates about the central axis as the fluid flows;
    a magnet disposed within the housing such that the central axis extends therethrough, said magnet configured to rotate simultaneously with the body about the central axis extending therethrough; and
    a sensor disposed within the housing and configured to sense rotation of the magnet as the flow detector angularly displaces about the central axis so as to detect angular displacement of the flow detector.

2. The flow measuring device of claim 1, the cylindrical body having a plurality of cavities spaced circumferentially about the central axis, each cavity being at least partially fillable with a portion of the fluid such that the cylindrical body transports the fluid portions through the flow passage section during rotation about the central axis.

3. The flow measuring device of claim 2, further comprising a processor electrically coupled with the sensor and configured to execute instructions stored on a memory device connected to or embedded in the processor to determine at least one of a flow rate of the fluid through the passage, an indication of a flow event, and a total volume of flow of the fluid through the passage.

4. The flow measuring device of claim 3, further comprising:
    a power regulator receiving an input voltage and providing regulated power to the sensor;
    an indicator activated by an output from the processor to indicate that the sensor is detecting a rotating magnetic field; and
    an output driver receiving output signals from the processor to indicate fluid flow.

5. The flow measuring device of claim 4 wherein the processor is further configured to execute instructions stored on the memory device to invert a portion of the range of values read from the sensor to prevent ambiguous readings.

6. The flow measuring device of claim 1, wherein the sensor is configured to generate data values representing the rotation angle of the magnet in accordance with a circular coordinate system.

7. A device for measuring flow of a viscous fluid, the flow measuring device comprising:
- a housing having an inlet, an outlet and a passage extending between the inlet and outlet;
- a shaft disposed within the housing and rotatable about a central axis, the axis extending generally perpendicular to at least one section of the passage;
- a flow detector disk mounted on the shaft, having a plurality of cavities spaced circumferentially about the central axis and being disposed at least partially within the passage so as to substantially obstruct the section of the passage such that the fluid flowing through the passage contacts the disk, at least partially fills at least one of the cavities and rotates the disk about the central axis while the disk transports the fluid through the flow passage section such that the fluid flows through the passage at a linear flow rate directly proportional to an angular rotation of the flow detector about the central axis;
- a magnet disposed within the housing such that the central axis extends through the magnet and a magnetic field of the magnet angularly rotates simultaneously with the angular rotation of the flow detector disk about the central axis extending therethrough;
- a sensor disposed within the housing and configured to sense rotation of the magnetic field about the central axis so as to detect angular displacement of the detector disk; and
- a processor electrically coupled with the sensor and configured to determine at least one of a flow rate of the fluid through the passage, an indication of a flow event, and a total volume of flow of the fluid through the passage.

8. The flow measuring device of claim 7, further comprising:
- a power regulator receiving an input voltage and providing regulated power to the sensor;
- an indicator activated by an output from the processor to indicate that the sensor is detecting a rotating magnetic field; and
- an output driver receiving digital output signals from the processor to indicate fluid flow.

9. The flow measuring device of claim 8 wherein the processor is configured to execute instructions stored on a memory device connected to or embedded in the processor to invert a portion of the range of values read from the sensor to prevent ambiguous readings.

10. The flow measuring device of claim 7, wherein the sensor is configured to generate data values representing the rotation angle of the magnetic field in accordance with a circular coordinate system.

* * * * *